United States Patent [19]

Matyas et al.

[11] Patent Number: 4,918,728
[45] Date of Patent: Apr. 17, 1990

[54] DATA CRYPTOGRAPHY OPERATIONS USING CONTROL VECTORS

[75] Inventors: Stephen M. Matyas, Manassas, Va.; Dennis G. Abraham, Concord, N.C.; Donald B. Johnson, Manassas, Va.; Ramesh K. Karne, Herndon, Va.; An V. Le, Arlington, Va.; Rostislaw Prymak, Dumfries, Va.; Julian Thomas, Lagrange, N.Y.; John D. Wilkins, Somerville, Va.; Phil C. Yeh, Poughkeepsie, N.Y.

[73] Assignee: International Business Machines Corporation, Armonk, N.Y.

[21] Appl. No.: 401,486

[22] Filed: Aug. 30, 1989

[51] Int. Cl.$^4$ .............................................. H04L 9/00
[52] U.S. Cl. ........................................ 380/21; 380/25; 380/45; 380/49
[58] Field of Search ..................... 380/21, 25, 45, 47, 380/49, 23, 24

[56] References Cited

U.S. PATENT DOCUMENTS

| | | | |
|---|---|---|---|
| 4,218,738 | 8/1980 | Matyas et al. | 380/45 |
| 4,223,403 | 9/1980 | Konheim et al. | 380/45 |
| 4,227,253 | 10/1980 | Ehrsam et al. | 380/25 |
| 4,386,233 | 8/1983 | Smid et al. | 380/25 |
| 4,500,750 | 2/1985 | Elander et al. | 380/25 |
| 4,503,287 | 3/1985 | Morris et al. | 380/45 |
| 4,578,530 | 3/1986 | Zeidler | 380/25 |
| 4,683,968 | 8/1987 | Applebaum et al. | 380/25 |
| 4,723,283 | 2/1988 | Nasagawa et al. | 380/45 |
| 4,723,284 | 2/1988 | Munck et al. | 380/25 |
| 4,811,393 | 4/1989 | Hazard | 380/21 |
| 4,850,017 | 7/1989 | Brachtl et al. | 380/21 |

OTHER PUBLICATIONS

R. W. Jones, "Some Techniques for Nandling Encipherment Keys," *ICL Technical Journal*, Nov. 1982, pp. 175–188.

D. W. Davies, et al., "Security for Computer Networks," John Wiley & Sons, New York, 1984, Section 6.5, Key Management with Tagged Keys, pp. 168–172.

*Primary Examiner*—Salvatore Cangialosi
*Attorney, Agent, or Firm*—John E. Hoel

[57] ABSTRACT

Data cryptography is achieved in an improved manner by associating with the data cryptography key, a control vector which provides the authorization for the uses of the key intended by the originator of the key. Among the uses specified by the control vector are limitations on encryption, decryption, authentication code generation and verification, translation of the user's data. Complex combinations of data manipulation functions are possible using the control vectors, in accordance with the invention. The system administrator can exercise flexibility in changing the implementation of his security policy by selecting appropriate control vectors in accordance with the invention. Complex scenarios such as encrypted mail box, session protection, file protection, ciphertext translation center, peer-to-peer ciphertext translation, message authentication, message authentication with non-repudiation and many others can be easily implemented by a system designer using the control vectors, in accordance with the invention.

43 Claims, 24 Drawing Sheets

FIG. 5

| CV TYPE MAIN TYPE  SUB TYPE | EXPORT CONTROL | USAGE | AV | SOFTWARE | EXTEN-SION | RESERVED | PARITY |
|---|---|---|---|---|---|---|---|
| 4b  3b | 1b | | 2b | 12b | 2b | | 8b |
| CF | CF | CF | CF | CFAP | CF | CF | CF |

NOTE: NUMBER OF BITS IN THE USAGE AND RESERVED FIELDS VARIES, DEPENDS ON THE CV TYPE OF THE CONTROL VECTOR

FIG. 6

| CV TYPE DATA KEY  PRI-VACY | EXPORT CONTROL | USAGE E  D | AV | SOFTWARE CV USAGE VERSION | EXTEN-SION | RESERVED | PARITY |
|---|---|---|---|---|---|---|---|
| 4b  3b | 1b | 1b  1b | 2b | 6b  6b | 2b | 30b | 8b |
| CF | CF | CF | CF | CFAP | CF | CF | CF |

FIG. 7

| CV TYPE DATA MAC KEY | EXPORT CONTROL | USAGE MG  MV | AV | SOFTWARE CV USAGE VERSION | EXTEN-SION | RESERVED | PARITY |
|---|---|---|---|---|---|---|---|
| 4b  3b | 1b | 1b  1b | 2b | 6b  6b | 2b | 30b | 8b |
| CF | CF | CF | CF | CFAP | CF | CF | CF |

FIG. 8

| CV TYPE DATA COMP KEY | EXPORT CONTROL | USAGE<br>E  D  MG  MV | AV | SOFTWARE CV USAGE VERSION | EXTEN-SION | RESERVED | PARITY |
|---|---|---|---|---|---|---|---|
| 4b          3b | 1b | 1B 1B 1B 1B | 2b | 6b         6b | 2b | 28b | 8b |
| CF | CF | CF | CF | CFAP | CF | CF | CF |

FIG. 9

| CV TYPE DATA XLATE KEY | EXPORT CONTROL | USAGE<br>XDIN  XDOUT | AV | SOFTWARE CV USAGE VERSION | EXTEN-SION | RESERVED | PARITY |
|---|---|---|---|---|---|---|---|
| 4b          3b | 1b | 1b         1b | 2b | 6b         6b | 2b | 30b | 8b |
| CF | CF | CF | CF | CFAP | CF | CF | CF |

FIG. 10

| CV TYPE DATA ANSI KEY | EXPORT CONTROL | USAGE<br>E  D  MG  MV  ACMB | AV | SOFTWARE CV USAGE VERSION | EXTEN-SION | RESERVED | PARITY |
|---|---|---|---|---|---|---|---|
| 4b          3b | 1b | 1B 1B 1B 1B  1B | 2b | 6b         6b | 2b | 27b | 8b |
| CF | CF | CF | CF | CFAP | CF | CF | CF |

FIG. 11
| CV TYPE ICV 000 | EXPORT CONTROL | SOFTWARE CV USAGE VERSION | | AV | EXTENSION | RESERVED | PARITY |
|---|---|---|---|---|---|---|---|
| 4b  3b | 1b | 6b | 6b | 2b | 2b | 32b | 8b |
| CF | CF | CFAP | | CF | CF | CF | CF |
FIG 12.
| CV TYPE TOKEN 000 | EXPORT CONTROL | AV | SOFTWARE CV USAGE VERSION | | EXTENSION | RESERVED | PARITY |
|---|---|---|---|---|---|---|---|
| 4b  3b | 1b | 2b | 6b | 6b | 2b | 32b | 8b |
| CF | CF | CF | CFAP | | CF | CF | CF |
FIG. 13
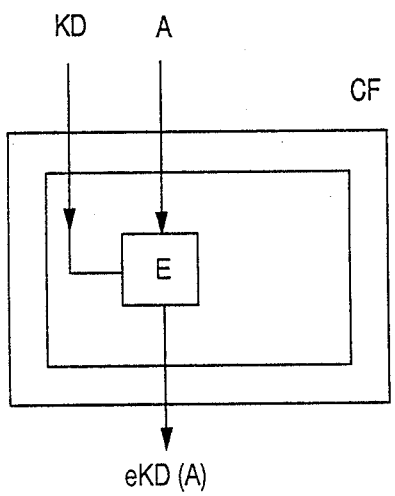
FIG. 14
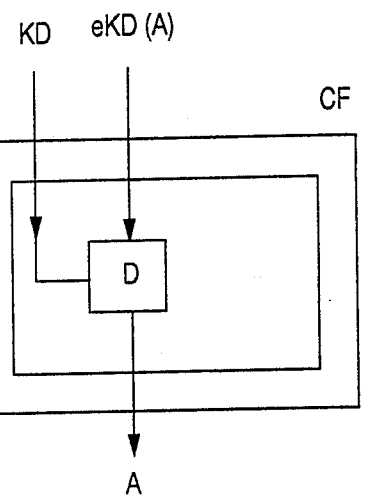

ENCRYPTION DECRYPTION

FIG. 24

| INST | EQUATIONS |
|---|---|
| ENC | $KD, A \longrightarrow eKD(A)$ : ECB MODE, 8 BYTE DATA AND KEY, ENCODE |
| DEC | $KD, eKD(A) \longrightarrow A$ : ECB MODE, 8 BYTE DATA AND KEY, DECODE |
| ENCI | $e*KM.C1(KD1), ICV, A, n, C1 \longrightarrow eKD1(ICV, A)$ ENCIPHER op |
| DECI | $e*KM.C1(KD1), ICV, eKD1(ICV, A), n, C1 \longrightarrow A$ DECIPHER op |
| GMAC | $e*KM.C1(KD1), <e*KM.C2(KD2)>$,<br>ICV $<e*KM.C3(OCV)>, A, n$,<br>icv-TYPE, OUTPUT-TYPE, mac-enc, C1, $<c2>, <C3> \longrightarrow$ MAC (64 BIT)<br>OR<br>$e*KM.C3(OVC)$ |
| VMAC | $e*KM.C1(KD1), <e*KM.C2(KD2)>$,<br>ICV $<e*KM.C3(OCV)>, A, MAC, n$,<br>icv-TYPE, OUTPUT-TYPE, mac-enc, C1, $<C2>, <C3> \longrightarrow$ YES/NO<br>OR<br>$e*KM.C3(OCV)$ |
| TCTXT | $e*KM.C1(KD1), ICV1, eKD1(ICV1, A)$,<br>$e*KM.C2(KD2), ICV2, n, C1, C2 \longrightarrow eKD2(ICV2, A)$ |

INSTRUCTIONS          EQUATIONS

4,918,728

DATA CRYPTOGRAPHY OPERATIONS USING CONTROL VECTORS

DESCRIPTION

BACKGROUND OF THE INVENTION

1. Technical Field

The invention disclosed broadly relates to data processing technology and more particularly relates to cryptographic applications in data processing.

2. Background Art

The following two copending patent applications are related to this invention and are incorporated herein by reference: B. Brachtl, et al., "Controlled Use of Cryptographic Keys via Generating Stations Established Control Values", Ser. No. 55,502, filed March 1987 now U.S. Pat. No. 4,850,017 and assigned to IBM Corporation; S. M. Matyas, et al., "Secure Management of Keys Using Control Vectors," filed August 1988, and assigned to IBM Corporation.

Various methods exist in support of electronic data security. Cryptography is the transformation of intelligible information into apparently unintelligible form in order to conceal the information from unauthorized parties. Cryptography is the only known practical method to protect information transmitted through communications networks that use land line, communications satellites, and microwave facilities. It can also be the most economical way to protect stored data. Cryptographic procedures can be used not only to protect the privacy of data, but also the integrity of data.

The cryptographic transformation of data is ordinarily defined by a selected algorithm, or procedure, under the control of a key. Since the algorithm is normally public knowledge, protection of the transformed, or enciphered, data depends on secrecy of the key. Thus the key must be kept secret to prevent an opponent from simply using the known algorithm and key to recover the enciphered data. The protection of the data therefore hinges on the protection of secret keys.

A new approach to key management is described in the above-mentioned copending application by S. M. Matyas, et al. which also provides a good background for this invention. The invention disclosed herein deals with data cryptography which has as its objective the application of cryptographic keys and methods to protecting the confidentiality and integrity of data via cryptography whereas the S. M. Matyas, et al. copending patent application deals with the generation, distribution, and management of the keys themselves.

Prior art methods for encryption and decryption of data have evolved into complex sequences of key and data manipulations to thwart the attacks of an eavesdropper. These sequences have become so convoluted that security management of the secure system is difficult. Changing the security features of a processor or a system of processors is costly. What is needed is a better way to control usage of keys and the data encrypted by those keys. It is important for the system administrator to be able to specify the security features of the system, including the ability to maintain the separation of certain types of data and the corresponding keys. To maximize the security of the system, the administrator should be able to do this on a dynamic, unannounced basis with ease. The system administrator must be able to enforce a security policy for the system which imposes restrictions on the users, the data, the keys and the crytographic operations which can be performed. That enforcement should be easily implemented by the administrator and yet should be secure from subversion by an attacker. The features of flexibility and security have been difficult to achieve in the prior art.

OBJECTS OF THE INVENTION

It is therefore an object of the invention to provide an improved method of data crytography.

It is another object of the invention to provide an improved method of data crytography which is more flexible than in the prior art.

It is another object of the invention to provide an improved data crytography method which controls the authorization of users to encrypt, decrypt or authenticate data in accordance with a security policy established by the system manager.

It is another object of the invention to provide a data cryptographic method which builds into the storage of a key the authority to use that key in a manner which has been authorized by its originator.

It is an object of the invention to improve file security by providing the ability to encrypt a data filem so that one portion is fully encrypted and another portion can be decrypted by authorized recipients.

SUMMARY OF THE INVENTION

These and other objects, features and advantages are accomplished by the invention disclosed herein. Data cryptography is achieved in an improved manner by associating with the data cryptography key, a control vector which provides the authorization for the users of the key intended by the originator of the key. Among the uses specified by the control vector are limitations on encryption, decryption, authentication code generation and verification, and translation of the user's data. Complex combinations of data manipulation functions are possible using the control vectors, in accordance with the invention. The system administrator can exercise flexibility in changing the implementation of his security policy by selecting appropriate control vectors in accordance with the invention.

Complex scenarios such as encrypted mail box, session protection, file protection, ciphertext translation center, peer-to-peer ciphertext translation, message authentication, message authentication with non-repudiation and many others can be easily implemented by a system designer using the control vectors, in accordance with the invention.

BRIEF DESCRIPTION OF THE DRAWINGS

These and other objects, features and advantages of the invention will be more fully appreciated with reference to the accompanying figures:

FIG. 5 shows the general format for Control Vectors (CV).

FIG. 6 shows the CV format for privacy keys.

FIG. 7 shows the CV format for MAC keys.

FIG. 8 shows the CV format for data compatibility keys.

FIG. 9 shows the CV format for data translate (XLATE) keys.

FIG. 10 shows the CV format for ANSI Data keys.

FIG. 11 shows the CV format for intermediate ICVs.

FIG. 12 shows the CV format for tokens.

FIG. 13 is a block diagram of the encode instruction.

FIG. 14 is a block diagram of the decode instruction.

FIG. 24 summarizes the equations for each of the data instructions.

DESCRIPTION OF THE BEST MODE FOR CARRYING OUT THE INVENTION

Figure 1:
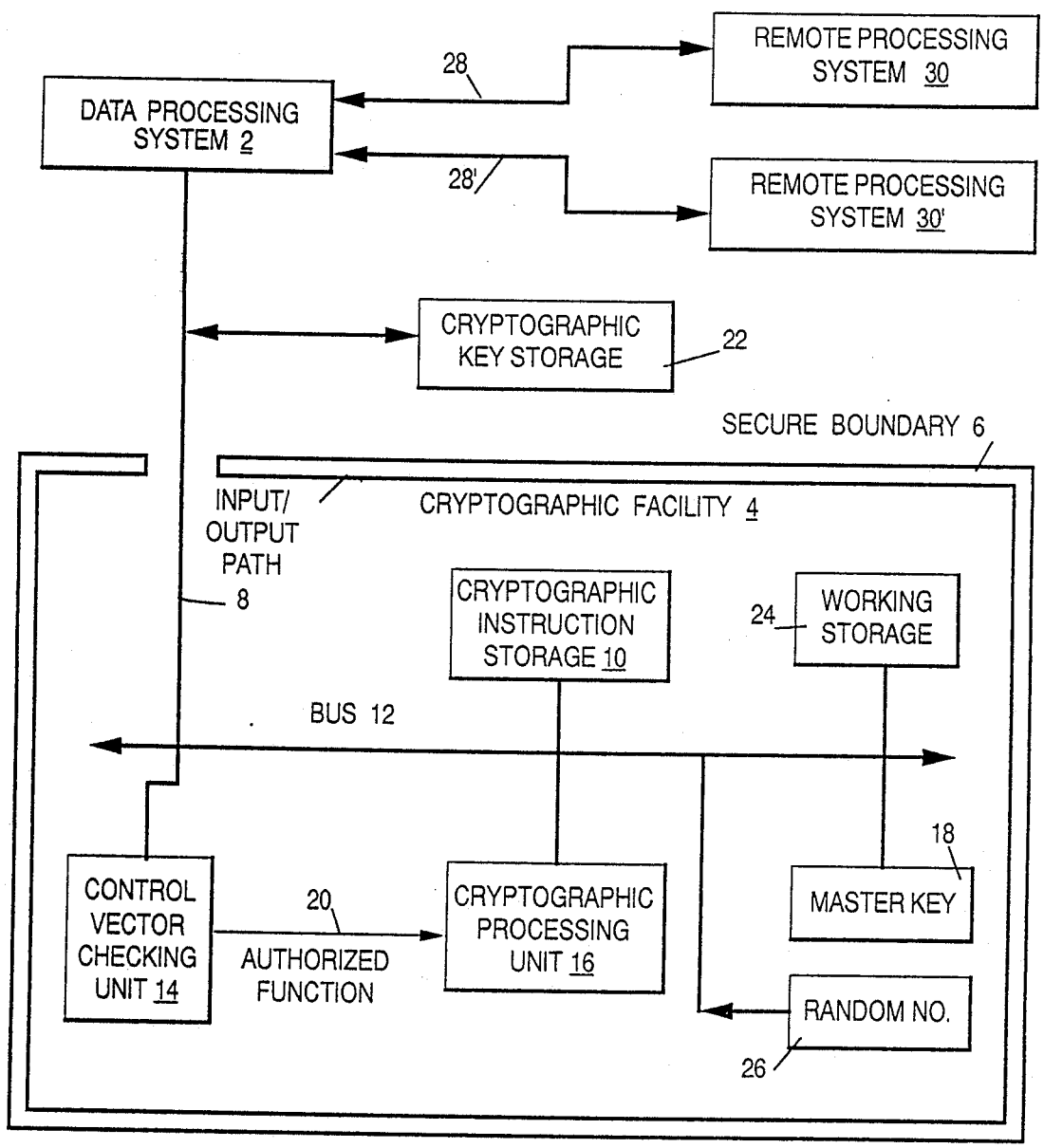
FIG. 1 is a system diagram showing the major components of the Cryptographic Facility (CF).

The reader should refer to the copending patent application by S. M. Matyas, et al. referred to above for an overall description of the principles of the Cryptographic Architecture (CA) underlying the invention disclosed herein. The Cryptographic Architecture enforces strict key separation within the local cryptographic facility and between systems by employing control vectors which force the recipient or user of a key to use the key in a manner consistent with the intentions of the originator of the key.

The following cryptographic data management functions are provided by the invention disclosed herein:

1. Data Confidentiality. Data confidentiality protects the contents of a message or file form unauthorized disclosure.

Applications of data confidentiality include the following:

a. Session Protection. Data encryption to protect the confidentiality or session level data transmission between two communicating devices. Each end user (device or application) shares a common data encrypting/decrypting key, thus permitting each end user to both send and receive encrypted data.

b. File Protection. Data encryption to protect the confidentiality of data files. A single end user (device or application) possesses a data encrypting/decrypting key permitting data to be encrypted for storage and to be decrypted, at a later time, for purposes of recovery or access to the file.

c. Encrypted Mail Box. The encrypted mail box describes a multi-user environment in which each user has a data/privacy key in two forms. The first form permits data encryption; the second form permits data decryption. The first form of the key is placed in a public directory or central registry accessible to all users of the system. Each so registered key is recorded under a user identifier belonging to the user who registers the key. The second form of the key is kept private by the user to which it belongs. Thus, a user i who wishes to send encrypted messages to user j, first requests user i's encryption from the public directory. Data encrypted with this key is then sent to user i and placed in user i's mail box. User i can read received mail by decrypting first with his/her private decryption key. But since no other user has access to user i's decryption key, the environment is such that users can encrypt mail for each other user but only the authorized designated receiving user can decrypt and read his/her mail.

d. Ciphertext Translation Center (CTC). The ciphertext translation center is a network node or device capable of securely translating encrypted data from encryption under a first data key to encryption under a second data key. In effect, the CTC possesses one or more data keys under which encrypted data may be received and one or more data keys under which received encrypted data may be re-encrypted. These data keys thus establish a secure channel permitting the CTC to translate ciphertext from one key to another but not to decrypt ciphertext. The CTC may be further restricted from encrypting data with one or more of these data/privacy keys for the purpose of introducing data into the secure channel.

e. Peer-to-Peer Ciphertext Translation. This environment consists of a chain of two or more CTCs which establish a secure channel from one set of network devices to another set of network devices. The first CTC in the chain possesses one or more data keys under which encrypted data may be received from the first set of network devices. Each CTC in the chain possesses one or more data keys under which encrypted data may be re-encrypted, but not decrypted. The CTCs may be further restricted from encrypting data with one or more of these keys for the purpose of introducing data into the secure channel. The last CTC in the chain re-encrypts the encrypted data under one or more data keys shared with members of the second set of network devices.

f. Translate Part of an Encrypted File. This is an application wherein part of an encrypted file can be translated to a key which can be conveniently shared with an intended receiver. The method avoids sharing the original data/privacy key used to encrypt the file, since doing so may jeopardize the confidentiality of data not intended to be shared.

2. Data Integrity. Data Integrity protects the contents of message or file from unauthorized modification. This includes changes, additions, and deletions to the data. Cryptography provides only methods for detecting unauthorized changes to data. It cannot prevent unauthorized changes to data.

3. Message Authentication. Message authentication is a procedure established between two communicants which allows each communicant to verify that received messages are genuine. Communicants can be people, devices, or processing functions. Message authentication allows the receiver of a message to determine that:
   a. The message originated with the alleged sender.
   b. The contents of the message have not been accidentally or intentionally changed.
   c. The message has been received in the same sequence that it was transmitted.
   d. The message was devliered to the intended receiver.

In other words, message authentication permits the receiver to validate a message's origin, contents, timeliness, and intended destination. Applications of message authentication include the following:
   a. Straight message authentication.
   b. Non-repudiation via MACGEN and MACVER.

FIG. 1 gives a block diagram representation of the data processing system with the cryptographic facility therein. In FIG. 1, the data processing system 2 executes a program such as the crypto facility access programs and the application programs illustrated in FIG. 2. These programs output cryptographic service requests for data cryptography operations using keys which are associated with control vectors. The general format for a control vector is shown in FIG. 5. Control vectors define the function which the associated key is allowed by its originator to perform. The invention herein is an apparatus and a method for validating that data cryptography functions requested for a data set by the program, have been authorized by the originator of the key.

As is shown in FIG. 1, contained within or associated with the data processing system 2 is a cryptographic facility 4 which is characterized by a secure boundary 6. An input/output path 8 passes through the secure boundary 6 for receiving the cryptographic service request, data, cryptographic keys and their associated control vectors from the program. The input/out path 8 outputs responses to those cryptographic requests from the cryptograpic facility. Included within the secure boundary 6 is a cryptographic instruction storage 10 which is coupled by units of the bus 12 to the input/output path 8. A control vector checking units 14 is coupled to the instruction in storage 10 and a cryptographic processing units 16 is also coupled to the instruction storage 10. A master key storage 18 is coupled to the cryptographic processing unit 16. The cryptographic facility 4 provides a secure location for executing data cryptography functions in response to the received service request.

The cryptographic instruction storage 10 receives over the input/output path 8 a cryptographic service request for performing a data cryptography function with a cryptographic key. The control vector checking unit 14 has an input coupled to the input/output path 8, for receiving a control vector associated with the cryptographic key. The control vector checking unit 14 also has an input connected to the cryptographic instruction storage 10, for receiving control signals to initiate checking that the control vector authorizes the data cryptography function which is requested by the cryptographic service request.

The control vector checking unit 14 has an authorization output 20 which is connected to an input of the cryptographic processing unit 16, for signalling that data cryptography function is authorized, the receipt of the authorization signal by the cryptographic processing unit 16 initiates the performance of the requested data cryptography function with the cryptographic key. A cryptographic key storage unit 22 is coupled to the cryptographic facility 14 over the input/output path 8. The cryptographic key storage unit 22 stores the cryptographic key in an encrypted form in which the cryptographic key is encrypted under a storage key which is a logical product of the associated control vector and the master key stored in the master key storage 18.

An example of recovering an encrypted key from the cryptographic key storage 22 occurs when the cryptographic instruction storage 10 receives over the input/output path 8 a cryptographic service request for recovering the cryptographic key from the cryptographic key storage units 22. The control vector checking unit 14 will then output in response thereto, an authorization signal on line 20 to the cryptographic processing unit 16 that the function of recovering the cryptographic key is authorized. The cryptographic processing unit 16 will then operate in response to the authorization signal on line 20, to receive the encrypted form of the cryptographic key from the cryptographic key storage 22 and to decrypt the encrypted form under the storage key which is a logical product of the associated control vector and the master key stored in the master key storage 18.

The storage key is the exclusive-OR product of the associated control vector and the master key stored in the master key storage 18. Although the logical product is an exclusive OR operation in the preferred embodiment, it can also be other types of logical operations.

The associated control vector, whose general format is shown in FIG. 5, is stored with the encrypted form of its associated cryptographic key in the cryptographic key storage 22. Since all keys stored on a cryptographic storage are encrypted under the master key, a uniform method for encryption and decryption of encrypted keys thereon can be performed.

The associated control vector, whose general format is shown in FIG. 5, includes fields defining the authorized types of cryptographic functions, including data cryptography functions, data encryption/decryption functions and personal identification numbers (PIN) processing functions. In the data cryptography applications, the data cryptography functions type is designated for the type field. The associated control vector also includes additional fields which can define export control for the keys and associated encrypted information and the usage of the keys and associated encrypted information.

The following provides a more detailed descrption of the components and operations of the invention.

Figure 2:
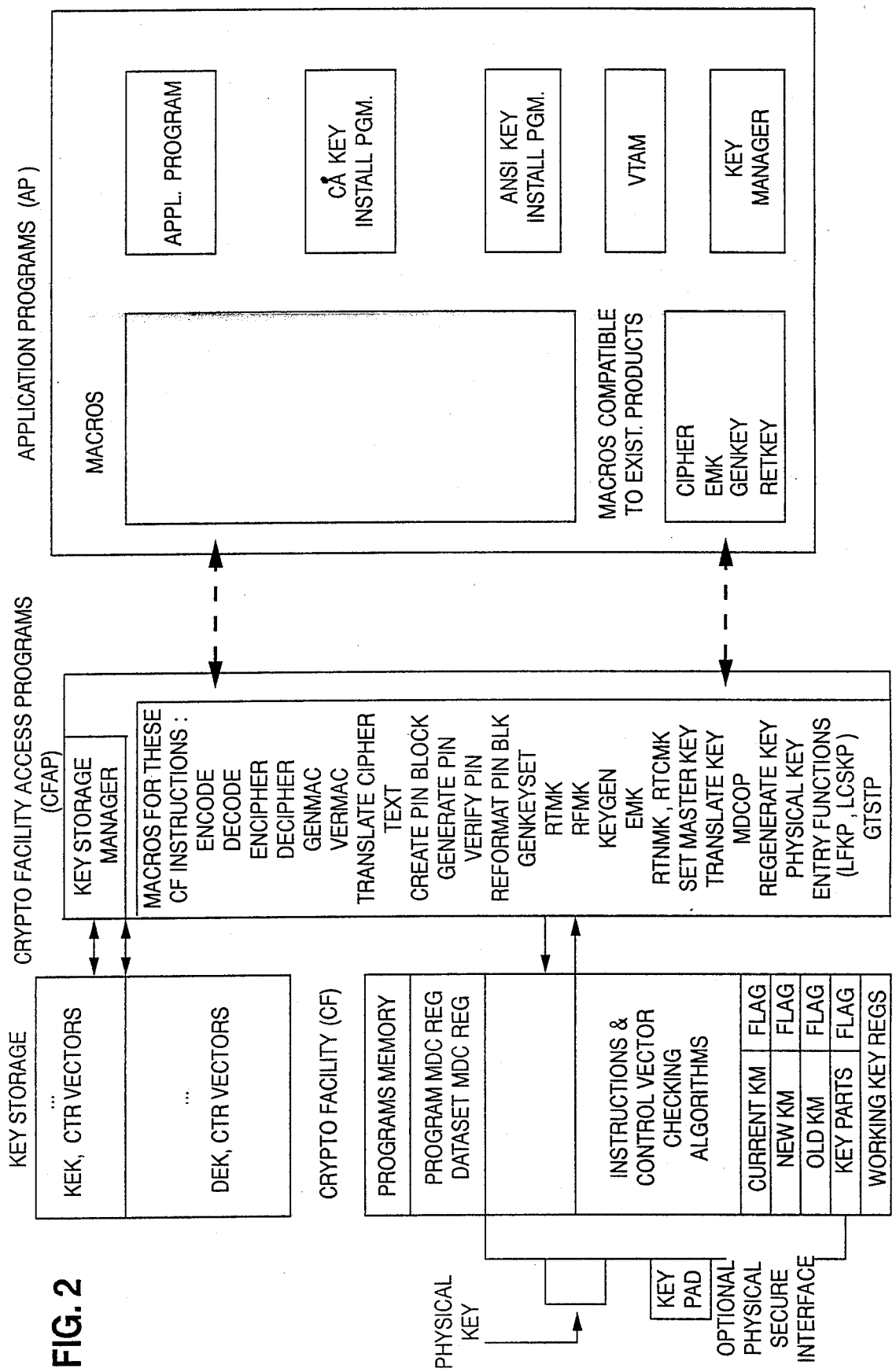
FIG. 2 is a system diagram showing the components of the CF, software driver CFAP and cryptographic application programs.

FIG. 2 shows the major components of a crypto subsystem. The cryptographic subsystem consists of a Crypto Facility (CF), Crypto Facility Access Program (CFAP), and Application Program (AP). Normally, the CF is implemented in hardware, inside a physically secure box. Depending upon the implementation, the CF, CFAP, and AP could all be in a physically secure box.

The Cryptographic Facility 4 consists of:
Key Registers
The registers and their usages are described below:
Master Key Register 18 The master key register is 128 bits wide, containing the master key.
New Master Key (NMK) register: The new master key register is 128 bits wide, containing the new master key that is going to become the current master key. The New Master Key will become the current master key only after a special instruction, the SMK instruction is ussed to load the value of new master key into the master key register.
Old Master Key Register The old master key register is 128 bits wide, containing the master key that was replaced by the current master key. The master key update mechanism is such that the current master key becomes the old master key prior to the new master key becoming the current master key.
Key Part Register The key part register is 128 bits wide, containing the value of a key part (component), or a complete key that is being installed via a key loading device such as a key pad or key board attached to the CF via an optional secured physical interface.
Working Key Register(s) For performance reasons, the system has working register(s), 128 bits wide each, to contain immediate working key(s) for fast accesses. For example, a key that is used to encrypt data is brought into the CF is encrypted form on the first use. It then is decrypted and the clear value can be stored in one of the working key registers. In subsequent uses to encrypt or decrypt the data, this clear key can be quickly accessed from a specific working key register, thus eliminating the repeated steps of decrypting the key prior to using it.
Program MDC Register (PMDC Reg) The program MDC register is 64 bits wide, containing the MDC of the program to be loaded in the program memory inside the CF.
Dataset MDC register (DMDC Reg) The dataset MDC register is 64 bits wide, containing the MDC of the datasets whose integrity is validated by CFAP. This normally is, at least, the key storage datasets.

Cryptographic instructions and control vector checking algorithms.
The instruction set and control vector checking algorithms are implemented in the secured cryptographic facility and are stored in the cryptographic instruction storage 10 which is a random access memory. They are executed in a microprocessor such as an Intel 80286 which can serve as the cryptographic processing unit 16. The control vector checking unit 14 can also be implemented in the cryptographic processing unit 16 or it can be implemented by a second microprocessor such as an Intel 80286 serving as the control vector checking unit 14.

Program Memory and Processing Engine

The system can also employ a memory inside the CF to store user's programs and a processing engine to execute the programs. An example of this is a program or macro for performing new algorithms for PIN verifications on new PIN formats.

Random Number Generator 26

The random number generator is an algorithmic procedure for producing 64 bit pseudo random numbers. The algorithm itself is nonsecret, but makes use of two 128 bit secret keys and a 64 bit nonsecret incrementing counter. Although nonsecret, the integrity and proper management of the counter are essential to security.

The Crypto Facility (CF) is a secure implementation containing the Data Encryption Algorithm and storage for a small number of key and data parameters in the cryptographic instruction storage 10. It can be accessed only through inviolate interfaces (secure against intrusion, circumvention, and deception) which allow processing requests, key, and data parameters to be presented, and transformed output(s) to be received.

The ANSI Data Encryption Algorithm (DEA) is a standard cryptographic algorithm for commercial data security products. The DEA is a symmetric block cipher algorithm that uses a 56-bit secret key to encipher 64 bits of plaintext to form 64 bits of cipher text. DEA keys are normally stored with 1 parity bit per byte, forming a 64-bit key. DEA forms the basis for the National Bureau of Standards approved Federal Data Encryption Standard, so it is also called DES.

The cryptographic facility must resist probing by an insider adversary who has limited access to the cryptographic hardware. "Limited" is measured in minutes or hours as opposed to days and weeks, and the adversary is constrained to a probing attack at the location where the system is installed, using limited electronic devices as opposed to a laboratory attack launched at a site under the conrol of the adversary using sophisticated electronic and mechanical equipment.

The cryptographic facility must detect attempts at physical probing or intrusion. This may be accomplished using a variety of electro-mechanical sensing devices.

The cryptographic facility must provide for the automatic zeroization of all internally stored clear keys. Such zeroization must be performed automatically whenever an attempted probing or intrusion has been detected. The cryptographic facility must also provide a manual capability to zeroize key storage via the front panel interface.

The crypto facility contains one master key KM. All other keys can reside on mass storage encrypted under a key formed by Exlusive ORing the master key with a valid control vector. Refer to U.S. Pat. No. 4,386,234 entitled "Cryptographic Communications and File Security Using Terminals" by Ehrsam, et al., assigned to IBM Corporation, and incorporated herein by reference, for a description of an example Cryptographic Facility.

The CFAP is the programming interface between the CF and the application program. Since users do not have direct access to the cryptographic facility, the CFAP is the programming interface through which the users can request the CF to perform specific operations.

Associated with the CFAP is the Key Storage outside the CF where encrypted keys are stored. No clear keys are stored outside the CF. The Key Storage 22 is also referred to herein as the "Cryptographic Key Data Set" (CKDS).

The CFAP typically consists of the following:

Key Storage Manager to manage keys stored in the key storage mentioned above.

CFAP Macros through which users access to the CF to perform cryptographic functions.

Application programs include user's application programs, some utilities such as a key installation utility, and communication programs such as IBM VTAM.

User's application programs consist of statements that will invoke certain CFAP macros to perform a specific task. As mentioned, the CFAP is the only interface through which application programs can request CF to execute a cryptographic operation. For example, a user might want to encipher a file prior to shipping it to another node on the network. His application program might have one statement that calls a CFAP macro to generate a key, and another statement that invokes another CFAP macro to encipher the data of the file with the given key.

Another example of a user's application program is one that allows the manual installation of keys on the system, similar to the installation program mentioned above.

| | Notation - The following notation is used herein: |
|---|---|
| ECB | Electronic code book |
| CBC | Cipher block chaining |
| KM | 128 bit Master key |
| KEK | 128 bit Key encrypting key |
| K | 64 bit key |
| *K | 128 bit key |
| (*)K | 64 or 128 bit key |
| KD | 64 bit data encrypting key |
| KK | 64 bit Key encrypting key |
| *KK | 128 bit Key encrypting key |
| KKo | offset 64 bit Key encrypting key |
| *KKo | offset 128 bit Key encrypting key |
| (*)KKo | offset 64 or 128 bit Key encrypting key |
| *KKNI | 128 bit partial notarizing Key encrypting key |
| *KN | 128 bit notarizing key, equivalent to *KKNIo |
| cx | 64 bit control vector |
| CxL | 64 bit left control vector |
| CxR | 64 bit right control vector |
| XOR or xor | exclusive or operation |
| or | logical or operation |
| X '0' | Hex notation |
| \|\| | concatenation operation |
| [x] | optional parameter x |
| not = | not equal |
| E or e | single encryption |
| D or d | single decryption |
| EDE or ede | triple encryption |
| DED or ded | triple decryption |
| Equations | The function of each instruction is mathematically denoted in the form: I1, I2, I3, I4, ... --- O1, O2, O3, ... where I1, I2, I3, ... are the inputs to the function and O1, O2, O3, ... are the outputs from the function. |
| KM.Cx | (KML XOR Cx) \|\| (KMR XOR Cx) = KMY \|\| KMX where, KML = Left 64 bits of the master key KM, KMR = right 64 bits of the master key KM, KMY = KML XOR Cx KMX = KMR XOR Cx |
| e*KM.Cx(key) | e*KM.Cx(key) = eKMY(dKMX(eKMY(key))) where, KMY = KML XOR Cx KMX = KMR XOR Cx key = 64 bit key |
| e*KEKn.CX(key) | e*KEKn.Cx(key) = eKEKY(dKEKX(eKEKY(key))) where, KEKY = KEKnL XOR CxL KEKX = KEKnR XOR CxR key = 64 bit key |
| e*KM.CxL(KEKnL) | e*KM.CxL(KEKL) = eKMY)dKMX(eKMY(KEKnL))) where, KEKL = left 64 bits of KEK KMY = KML XOR CxL KMX = KMR XOR CxL |
| e*KM.CxR(KEKnR) | e*KM.CxR(KEKR) = eKMY(dKMX(eKMY(KEKnR))) where, KEKR = right 64 bits of KEK KMY = KML XOR CxR KMX = KMR XOR CxR |
| e*KEKo(key) | e*KEKo(key) = eKEKLo(dKEKRo(eKEKLo(key)) where, KEKLo = KEKL XOR cntr KEKRo = KEKR XOR cntr cntr = implicit 64-bit key-message counter for KEK key = 64 bit key |

Cryptographic Separation of Keys

Keys are separated cryptographically by the invention according to key type and key usage attributes.

1. The architecture guarantees that cryptographic keys can be used only in the way or ways prescribed and intended.
2. Internal Versus On-The-Link Separation. Internally (i.e., within the cryptographic facility), keys are separated via control vectors or other appropriate/equivalent mechanism. On the link, keys are separated using control vectors.
3. Hardware Versus Software Enforcement. Certain cryptographic separation is implemented in hardware; other cryptographic separation can be implemented via software.
4. Control vector key types and compatibility-mode key types. In order that the compatibility-mode key types will not diminish the security, certain rules governing generation, distribution, and usage of these two classes of key types is imposed.
5. A list of required key separations provided by the invention is listed below:
   (a) Data Privacy. ENCIPHER from DECIPHER, allows public key protocols such as mailbox, ballot and pass on.
   (b) Data MAC. MACGEN from MACVER, allows for non-repudiation (equivalent of electronic signature).
   (c) Data XLATE. Allows a secure translate channel to be established, where intermediate devices cannot decrypt encrypted data.
   (d) Data COMPAT. Allows compatibility mode without weakening security of other data keys.
   (e) Data ANSI. Allows ANSI X9.17 data cryptography to be coexist with non-ANSI X9.17 data cryptography without loss of security to either approach.
   (f) Key Enerypting Keys. KEK Sender from KEK Receiver.
   (g) PIN Keys. PIN Generating Key from PIN Encrypting Key.

Figure 3:
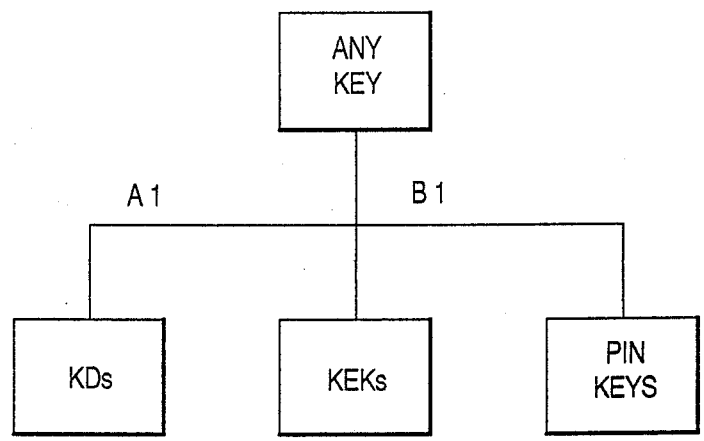
FIG. 3 illustrates the fundamental crytographic key separation.
Figure 4:
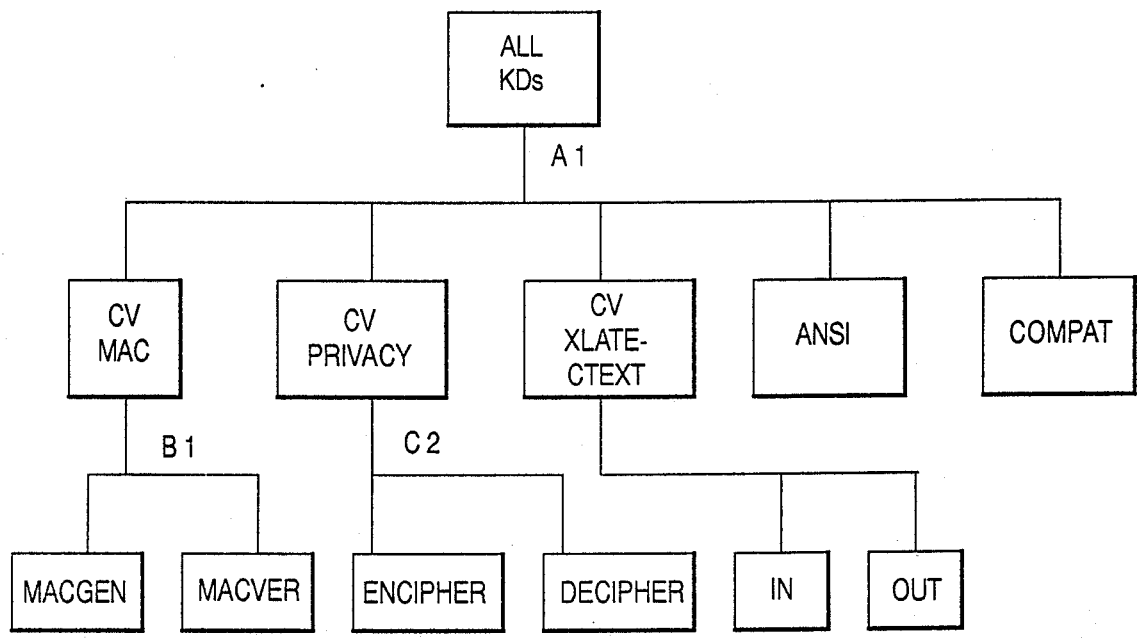
FIG. 4 illustrates data key separation.

The following notation is used for FIGS. 3 and 4: Notation:

Near each line leaving a box is a separation letter and a priority number. The separation letter will correspond with descriptions below:

The range of priority numbers (1 through 4) should be interpreted as follows:
1. Absolute necessity
2. Strongly recommended
3. Recommended
4. Desirable Fundamental Key Separation FIG. 4 illustrates the fundamental cryptograhic key separation. An explanation of the separation is given below:
1. A. Data Keys: KEKs and PIN keys If KDs (Data Keys) are not separated from KEKs and PIN keys, then Decipher data function used with data keys could be misused to decipher KEKs and PINs.
2. B. Key Encrypting Keys: PIN keys If KEKs (Key Encrypting Keys) are not separated from PIN Keys it would be possible for an outsider to wiretap an encrypted PIN block and replay it in place of an encrypted KD. Ahead of time, an insider accomplice could replace the encrypted stored KEK with the encrypted stored PIN Key in the receiving node's cryptographic key data set. The PIN block would be then recovered and used as a data key at the receiving node. Subsequently, data that would be encrypted under this PIN block used as a data key would be much easier to subject to a key exhaustion attack as the variability of PINs (normally four to six decimal digits) is much less than that of a random 56 bit data key.

Data Keys Separation

FIG. 4 shows the flow chart of the Data keys separation. The justification for the separation are given below.

1. 
   A—Authentication: Privacy
   An insider who can collect plain and corresponding ciphertext encrypted with a MAC key can perpetrate an attack against the MAC procedure. For example, it would be possible to construct fraudulent messages and MACs that would be authenticated and accepted by the MAC algorithm. Thus, the data keys used for encryption/decryption should not be used for authentication of data. On the link, if an intercepted data key can be substituted for a MAC key, the transmitted ciphertext (under that data key) could be used to construct a fraudulent message and MAC.

B—Xlate Ciphertext: Privacy
   By definition, Xlate Ciphertext implies the use of a pair of data keys KD1 and KD2, where ciphertext encrypted under KD1 is decrypted under KD1 and then re-encrypted under KD2 without exposing the data to the calling application program. Otherwise, Xlate Ciphertext could be performed using the existing Decipher and Encipher functions.

C—ANSI: all others
   ANSI keys have their own protocol for key distribution and an additional possible usage referred to as ANSI COMBINE KEYS. These differences mandate a separate pool for all ANSI keys.

D—Data COMPATIBILITY" All others
   Data Compatibility keys exist due to requirements to be compatible with previous systems such as IBM CUSP/3848, IBM PCF, and IBM 4700. As the enforced internal separation in these systems does not extend to the level of separating MAC from Privacy keys, these keys need to be distinguished from the CV keys which support such an improved level of separation.

2. 
   B—MACGEN: MACVER
   Provides an audit trail to "prove" who originated a message and MAC (called non-repudiation). This method is no more secure than the CF, and assumes a mutual trust in the integrity and secrecy of keys stored in the CF.

3. 
   C—Encipher: Decipher
   Provides true separation of the encipher and decipher functions, thus permitting data to be enciphered under a data key without exposing the right to decipher under that same data key. For example, an encipher only data key could be used in a 'vote and pass on' balloting scheme. A decipher only data key could be used in an environment where a user is authorized to read but not write some data.

Control Vectors

Control Vectors Concept

The control vector is a 64 bit nonsecret cryptographic variable for controlling the usage of keys. Each key K defined to the cryptographic system has an associated control vector C, i.e., the key and control vector define a tuple (K, C).

Each control vector specifies a CV TYPE, which broadly defines how the key may be used and the rules governing how that key may be communicated on the link. A key may be a data key, sender key encrypting key, receiver key encrypting key, PIN encrypting key, PIN generating key, Intermediate ICV, Key part or Token. Additional bits in the control vector specify exactly in which cryptographic instructions and parameter inputs the key may operate. Still other bits control the export of the key, i.e., whether the key can be exported or not.

The control vector is coupled cryptographically to the key via a special encryption function. For example, when the K is stored in a Key Storage, K is encrypted under a key formed by Exclusive-ORing the control vector with the master key, i.e., K is stored as the tuple (eKM.C(K), C), where KM.C denotes KM xor C. When K is transmitted on the link (from one device to another), a similar encrypted form is used. In this case, the master key KM is replaced by a key encrypting key KEK, where KEK is a key shared between the sender and receiver. Thus, K is transmitted as the tuple (eKEK.C(K), C). The architecture does not require that the control vector be stored or transmitted with the key in situations where its value is defined implicitly from the context or can be reconstructed from available key-related information.

Since the control vector (C) is tightly coupled to the key (K), via the encrypted form eKM.C(K) or eKEK.C(K), it is apparent that K cannot be recovered from its encrypted form unless C is correctly specified. Thus, if the tuple (eKM.C(K), C) is provided as an input to a requested cryptographic instruction, the cryptographic facility will first check the supplied value of C to determine that the requested usage of the key is permitted. Only then will C be used to decrypt eKM.C(K) to recover the clear value of K internal to the cryptographic facility. If a false value C* is specified, the cryptographic facility may be fooled temporarily into accepting C*, but K will not be recovered properly. Thus, there is no opportunity for a user to recover the correct value of K unless the correct value of C is also specified. The cryptographic principle is thus the basis upon which the entire architecture is built; and additional security is provided as necessary and where appropriate.

The control vector is a compact data structure for defining the usage attributes of a cryptographic key. The control vector is cryptographically coupled to the key via an encryption process. This process is such that the key can be decrypted properly only if the control vector is correctly specified. (Even a single bit change in the control vector will cause an entirely different key to be recovered.)

CV Checking

The control vector is designed to minimize CV checking. Control vector usage bits are defined and structured so that each usage attribute, by itself, grants or denies a specific usage. Thus, the capability to encipher data via the Encipher Data instruction is controlled via a single "Encipher" bit within the control vector whose type/subtype is "data/privacy".

Thus, each usage attribute is defined independently from all other usage attributes. This guarantees a CV checking process such that each instruction checks only the usage attributes called for by the requested function. A design wherein usage attributes are enable only when certain other attributes are enabled or disabled is specifically avoided, since this increases CV checking. Some cross checking of attributes among two or more control vectors is required, but is kept to a minimum.

To facilitate and simplify CV checking, each cryptographic instruction, where necessary, is passed a "mode" parameter declaring a specified use of the key or keys passed as parameters to the instruction. Thus, the CV checking process tests each control vector according to the specified "mode". This eliminates costly cross checking among control vector attributes to ensure consistency.

The design also follows a principle that no cryptographic instruction generates a control vector. All control vectors are supplied to the cryptographic instructions as parameter inputs.

Where possible, like usage attributes and field definitions are located at the same bit positions in the control vector, regardless of CV type. This facilitates CV checking. For example, the translate ciphertext instruction interrogates the same bit positions in the data/privacy and the data/xlate control vectors, even though the usage bits are "E" and "D" for the data/privacy CV and "XOUT" and "XIN" for the data/xlate CV, respectively.

CV Structure

In general, the control vector structure (including formats, field and bit assignments) has been defined to minimize and to facilitate CV checking, while at the same time providing cryptographic security. The CV structure, so to speak, is the variable with the greatest degree of freedom in the design process.

The following design options have been employed in the control vector:

1. Vertical Separation. The control vector has a "CV Type" field that provides vertical separation within the control vector structure, much like the separation provided by variants. Control vector types are defined along intuitive lines, following existing key terminology and data cryptography. However, vertical separation is implemented only where necessary under the CA, thus ensuring architectural simplicity and ease of comprehension of the CV checking rules.

By first defining broad classes of CV Main Types (e.g. Data Keys, Key Encrypting Keys, PIN Keys) and then further defining CV Subtypes and usage attributes within CV Type, the CV checking rules can be optimized much in the same way that a "divided and conquer" search can be employed more effectively than a brute force approach.

2. Horizontal Separation. The control vector is ideally suited as a data structure for recording the usage attributes to be associated with a key (or other cryptographic variable). Within the CA, this is accomplished by specifying a bit in the control vector for every cryptographic instruction (or key parameter within the instruction, if more than one key parameter may participate) where the key may be used as an input. A bit value of "1" signifies that a usage of the key is "enabled" by the CF whereas a bit value of "0" signifies that a usage of the key is "disabled" by the CF. This form of control vector structuring is called horizontal separation.

3. Encoded Fields. A field of two or more bits is sometimes encoded for reasons of security. An encoded field has the property that individual bits have no significance by themselves, but the bits together define a set of possible values. Encoded fields have the advantages that they define mutually exclusive events since the field can take on only one value at a time. Encoded fields have the potential disadvantage that CV checking is not always optimized from a performance standpoint. However, encoded fields are sometimes necessary to ensure that usage attributes cannot be mixed in inappropriate combinations that give rise to cryptographic attack or introduce some cryptographic weakness.

4. Protection From Non-System Generated Keys. The method for coupling the control vector and key is such that CV checking is unable to detect a system generated key (via KGEN or GKS) from a non-system generated key. For this reason, a "back-door" method exists within the architecture for generating a keys and control vectors. It consists of defining a control vector "of choice" and a random number which is then represented as a key encrypted in the manner described under the architecture using the selected control vector. (However, the method has no capability to control the key actually recovered within the cryptographic facility.)

The so-called "back-door" method of key generation is primarily an annoyance, although in some cases cryptographic attacks would be possible if additional measures of defense were not taken in the architecture. It would be a simple matter to define an architecture that eliminates this "back-door" key generation (once and for all), but doing so would introduce additional unwarranted complexity and processing. A more practical approach is followed by the CA, viz., the "back-door" key generation problem is prevented only where necessary for security reasons. Thus, a good balance among security, complexity, and performance is achieved. Techniques to avoid cryptographic weaknesses introduced by the "back-door" method of key generation are these:

(a) Where necessary, conflicting usage attributes within a single control vector are split among two control vectors. The GKS instruction has checking that prevents so-called bad combinations of key pairs from being generated.

(b) Where necessary, conflicting usage attributes within a single control vector are grouped into a single encoded field.

(c) As a last resort, extra redundancy is used so that the CF can validate its own system generated keys.

5. Even Parity for Control Vectors. Even parity is enforced on the control vector. This ensures that the Exclusive-OR of an odd parity key with the control vector will result in an internal key of odd parity. This, in turn, ensures compatibility with hardware that may check such internally derived keys for odd parity (if such checking is enforced). Saying it another way, the CA cannot ensure that hardware will not enforce this odd parity on internal keys.

A control vector of 64 bits, numbered 0 through 63. The most significant bit is bit 0, by convention. Of the 64 bits, there are 8 parity bits.

6. Anti-Variant Bits. This guarantees cryptographic separation between variants and control vectors, which may unavoidably be mixed in some implementations internal to a node.

7. Avoid Onto Mappings. The control vector design and the manipulation of the control vector via the cryptographic instruction set avoids instances where CV fields with multiple values are mapped into a single value. Some specific instances of such onto mappings are allowed (e.g., LCVA, RFMK, and RTMK instructions) where security is not jeopardized.

CFAP Control

Certain bits in the control vector are reserved for CFAP. These bits can be used by CFAP for further data cryptography control. These bits are not checked by the CF, but are entirely managed by CFAP.

General Format for Control Vectors

FIG. 5 shows the general format for control vectors. The first row of of FIG. 5 shows the fields that are in common for most of the control vectors. They are briefly described as follows: (Further details can be found in subsequent subsections.)

CV Type

This field indicates the type of control vector, and is also the key type of the key to which this control vector is attached. The CV Type field consists of main-type and sub-type.

The main types of a control vector are:

Data key
  Data keys are used to encrypt/decrypt data, or to authenticate data.
PIN key
  PIN keys are used to encrypt PINs or to generate PINs.
Key-encrypting key
  Key-encrypting keys are used to encrypt keys.
Key part
  A key part is a part or a component of a key, having the same length as the key. For example, a key K may have two key parts Ka and Kb such that Ka XOR Kb=K.
Intermediate ICV
  An Intermediate ICV is used during MAC processing to encrypt the intermediate Output Chaining Value of a segment of data or message. This OCV is then fed into the next segment of the data and used as an ICV.
  This occurs when a message or data on which a MAC to be generated or verified is long and must be divided into shorter segments.
Token
  Tokens are variables used to protect the integrity of the data keys stored in the Data Key Dataset (a key storage for Data keys). They help prevent the access of data keys by unauthorized users.

The sub type differentiates the classes of keys of the same main type. For example, a key of main type data key can have the sub type of privacy (capable of doing encryption and decryption); or MAC (capable of doing data authentication); or XLATE Data (capable of translating ciphertext); etc. When no sub-type distinction is made, the keys are normally referred by the main type (e.g., Data key, PIN key, etc.)

Export Control

This field indicates how the export of the key associated to this control vector is controlled, and whether the key is allowed to be exported.

CF Enforced Usage

This field indicates for what CA functions the key can be used, and how it is used. For example, a data privacy key may have the usage attributes E=1 and D=1, which indicate that the key can be used in the Encipher and Decipher function to encrypt and decrypt the data, respectively.

AV (Anti-Variant)

This field differentiates any valid control vector from the 64 predefined variants that are used in variant-based crypto systems. Since all 8 bytes of the any variant of the 64 predefined variants are the same, setting the value of the AV field such that at least two bytes of the control vector are not the same will differentiate a valid control vector from a predefined variant.

Software Bits

This field represents control vector bits that are controlled/managed entirely by CFAP; The software field is not checked/enforced by the hardware (CF). When no control vector exists, CFAP builds a control vector from information supplied to CFAP (normally via parameter in a macro). When a control vector already exists, CFAP will check the control vector (including the software field) to determine whether the key is allowed to operate in the manner specified/requested. The hardware (CF), unlike software (CFAP), checks only those bits associated with a CA instruction, other usage bits are not checked).

Extension

This field indicates whether the control vector is a 64 bit control vector or an extended control vector of 128 bits. In the current CA, all the control vectors have 64 bits in length. This field is defined now to ease the expanding of the control vector in the future when the number of bits required to specify the control vector exceeds the b4 bit length.

Reserved Bits

This field is reserved for the system for future use.

Parity Vector

Every parity bit is the even parity of the preceding 7 bits of the byte.

For key-encrypting key control vectors, besides the common fields listed above, there are two additional fields, KEY FORM and LINK CONTROL.

Key Form

This field indicates the length of the key (single or double length) and whether the key half associated with the control vector key is the right or left half of the key. Note that for a single length key, the right half is the same as the left half and is the key itself.

Link Control

This field indicates how the key-encrypting key associated to this control vector is used to transmit other keys on the link, and what type of system (e.g., CV system or non-CV system) can keys be shipped to or received from, under this key-encrypting key.

Note that the descriptions in the second row and the third row in the general figure and other referenced figures in this section are not part of the control vector. They are put there to give information on the fields of the control vector as follows:

The second row indicates the bit length of the fields. The abbreviation 'b' stands for 'bit'. For example, 1b stands for 1 bit, 3b stands for 3 bits, etc.

The third row indicates whether the field is checked by hardware (CF) or software (CFAP).

Control Vector Format for Data Key

Data keys are divided into the following subtypes:

Data Compatibility Key. This is the data key that would be used to maintain compatibility with existing systems such as IBM 3848/CUSP or IBM 4700 FCS. Since these existing systems do not have the cryptographic separation between privacy and authentication, this key can be used to perform any or all of the following functions: encipher, decipher, generate MACs and verify MACs. This control vector can be removed (i.e., substituted by CV=0 on-the-link) when it is exported to other systems (via the RFMK instructions), whereas the control vectors for all other data keys except ANSI data keys cannot be removed.

Privacy Key. This is the key used for enciphering and/or deciphering only.

MAC Key. This is the key used for the purpose of data authentication only. That is, it can only be used to generate MACs and/or verify MACs.

Data Translation Key (Data XLT Key). This is the key used in the translation of ciphertext.

ANSI Key. This is the key that is used in ANSI applications. It can be used to encipher and decipher data or to generate and verify MACs. It can also be combined with another ANSI key to form an ANSI MAC key (i.e., a Data ANSI key with generate MAC/verify MAC capability). This control vector can be removed when exported to other systems (i.e., substituted by CV=0 on-the-link) via the ARFMK instruction, whereas the control vectors for all other data keys except compatibility keys cannot be removed.

Depending on the CV subtype of the control vector, the bits in the USAGE field have specific meaning to be described shortly.

Control Vector for Privacy Keys

Refer to FIG. 6. The following is a detailed description of each field and subfield of this figure.

CV Type

CV Type for privacy key (main type="DATA KEY", subtype="PRIVACY".

Export Control (controls exporting of this key)

This field occupies 1 bit:
EXPORT CONTROL=1: This key can be exported by RFMK. Also, the RFMK, RTMK and LCVA instruction can reset this bit to 0.
EXPORT CONTROL-0: This key cannot be exported by RFMK. Also, it cannot be changed to 1 by any instruction.

As an example, suppose node X generates a key K and control vector C and sends them to node Y.

Usage (a) E

E=1: This key can be used in the ENCIPHER instruction to encrypt the data.

E=0: This key cannot be used in the ENCIPHER instruction to encrypt the data.

(b) D

D=1: this key can be used in the DECIPHER instruction to decrypt the data.

D=0: This key cannot be used in the DECIPHER instruction to decrypt the data.

AV (Anti-Variant)

This field occupies two bits, used to differentiate the control vector from 64 predefined variants that are used in variant-based crypto systems. Since all 8 bytes of the any variant of the 64 predefined variants are the same, setting the value of the AV field such that at least two bytes of the control vector are not the same will differentiate a valid control vector from a predefined variant.

Software bits

This field occupies 12 bits.

(a) CV Version

This field is 6 bits long and is used by CFAP to distinguish the current control vector definition from future definitions.

(b) Software=Enforced Usage See also the CFAP section.

CVDPIM (Control Vector Data Privacy Icv Mandatory)

CVDPCU (Control Vector Data Privacy CUsp)

CVDP47 (Control Vector Data Privacy 4700)

CVDPM8 (Control Vector Data Privacy Multiple of 8)

Extension

This field indicates whether the control vector is a 64 bit control vector or an extended control vector of more than 64 bits.

Reserved bits

This field is reserved for the system for future use.

Parity

This field consists of the last bit of every byte of the control vector. The parity bit of each byte is set to achieve even parity for the byte.

Control Vector for MAC keys

Refer to FIG. 7. The following is a detailed description of each field and subfield of this figure.

CV Type

CV TYPE for MAC key (main type=:DATA KEY", sub type="MAC").

Export Control (controls exporting of this key)

Same description as that of Privacy keys.

Usage (a) MG

MG=1: This key is permitted to be used in the GMAC instruction to generate MACs on data.

MG=0: This key is not permitted to be used in the GMAC instruction to generate MACs on data.

(b) MV

MV=1: This key is permitted to be used in the VMAC instruction to verify MACs on data.

MV=0: This key is not permitted to be used in the VMAC instruction to verify MACs on data.

AV (Anti-Variant)

Same description as that of Privacy keys.

Software bits

This field occupies 12 bits.

(a) CV Version-Same description (b) Software-Enforced Usage See also the CFAP section CVDML4 (Control Vector Data MACLEN=4)

CVDM99 (Control Vector Data MAC MODE=ANSI×9.9)

CVDM19 (Control Vector Data MAC MODE=ANSI×9.19)

CVDM00 (Control Vector Data MAC MODE=IBM 4700)

CVDM30 (Control Vector Data MAC MODE=IBM 4730)

Extension

Same description as that of Privacy keys.

Reserved bits

Same description as that of Privacy keys.

Parity bits

Same description as that of Privacy Keys.

Control Vector for Data Compatibility Keys

Refer to FIG. 8. The following is a detailed description of each field and subfield of this figure.

CV Type

CV TYPE=for data compatibility key (main type="DATA KEY", sub type="COMPATIBILITY"

Export Control

Same description as that of Privacy keys.

Usage (a) E

E=1: This key can be used in the ENCIPHER instruction to encrypt the data.

E=0: This key cannot be used in the ENCIPHER instruction to encrypt the data.

(b) D

D=1: This key can be used in the DECIPHER instruction to decrypt the data.

D=0: This key cannot be used in the DECIPHER instruction to decrypt the data.

(c) MG

MG=1: This key can be used in the GMAC instruction to generate MACs on data.

MG=0: This key cannot be used in the GMAC instruction to generate MACs on data.

(d) MV

MV=1: This key can be used in the VMAC instruction to verify MACs on data.

MV=0: This key cannot be used in the VMAC instruction to verify MACs on data

AV (Anti-Variant)

Same description as that of Privacy keys.

Software bits

This field occupies 12 bits.
(a) CV Version
Same description as that of Privacy keys.
(b) Software-Enforced Usage

Extension

Same description as that of Privacy keys.

Reserved bits

Same description as that of Privacy keys.

Parity bits

Same description as that of Privacy keys.

Control Vector for Data XLATE key

Refer to FIG. 9. The following is a detailed description of each field and subfield of this figure.

CV Type

CV Type for data XLATE key (main type="DATA KEY", sub type="XLATE")

Export Control (controls exporting of this key)

Same description as that of Privacy keys.

Usage (a) XDout
  XDout=1: This key is permitted to be used as the output data key in the TRANSLATE CIPHERTEXT instruction.
  XDout=0: This key is not permitted to be used as the output data key in the TRANSLATE CIPHERTEXT instruction.
(b) XDin
  XDin-1: This key is permitted to be used as the input data key in the TRANSLATE CIPHERTEXT instruction.
  XDin=0: This key is not permitted to be used as the input data key in the TRANSLATE CIPHERTEXT instruction.

AV (Anti-Variant)

Same description as that of Privacy keys.

Software Bits

This field occupies 12 bits
(a) CV Version
(b) Software-Enforced Usage
None.

Extension

Same description as that of Privacy keys.

Reserved Bits

Same description as that of Privacy keys.

Parity Bits

Same description as that of Privacy keys.

Control Vector for ANSI Data Keys

Figure 16:
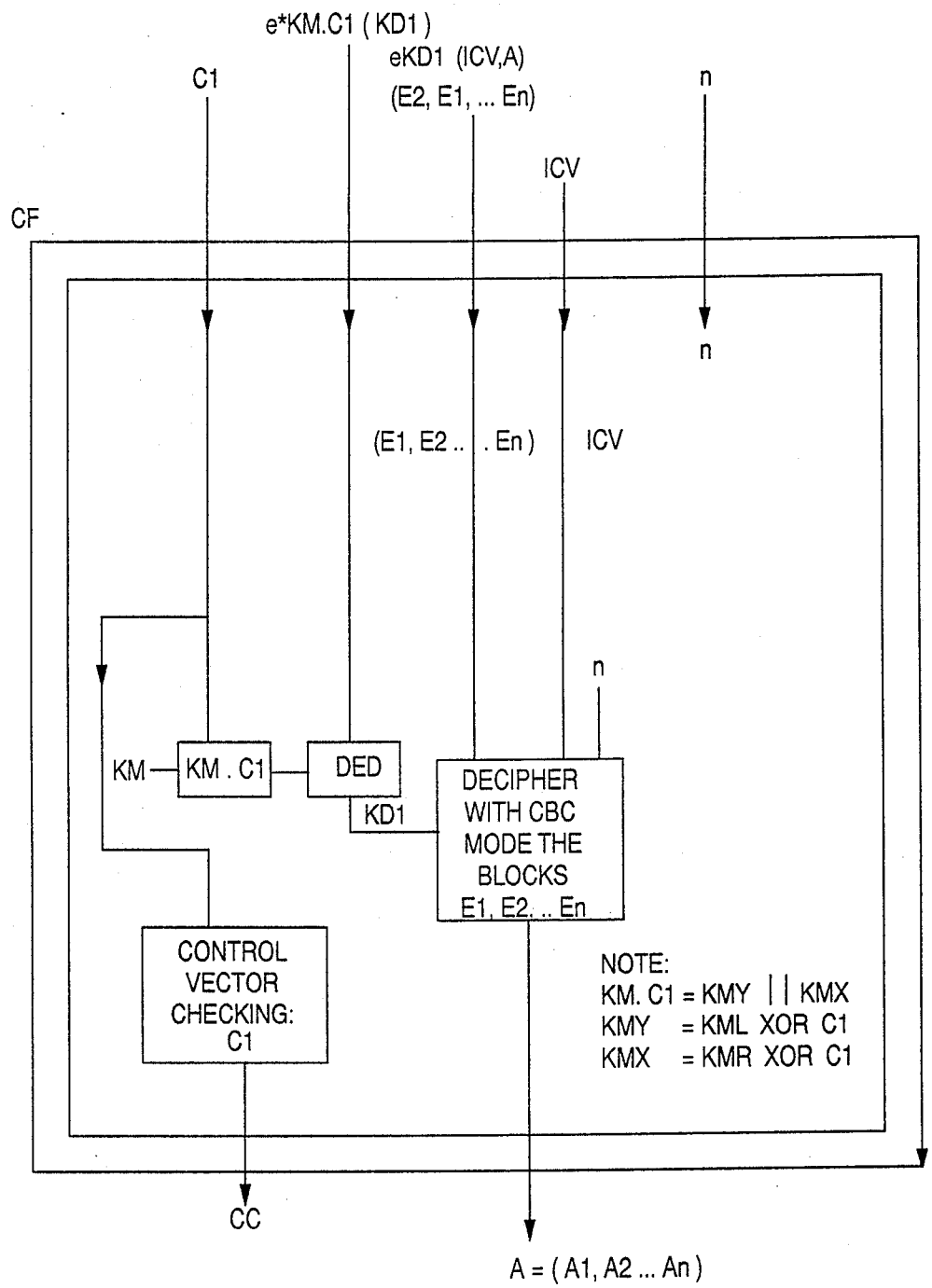
FIG. 16 is a block diagram of the decipher instruction.

Refer to FIG. 16. The following is a detailed description of each field and subfield of this figure.

CV Type

CV Type for data ANSI key (main type="DATA KEY", sub type="ANSI")

Export control

Same description as that of Privacy keys.

Usage (a) E
  E=1: This key can be used in the ENCIPHER instruction to encrypt the data.
  E=0: This key cannot be used in the ENCIPHER instruction to encrypt the data.
(b) D
  D=1: This key can be used in the DECIPHER instruction to decrypt the data.
  D=0: This key cannot be used in the DECIPHER instruction to decrypt the data.
(c) MG
  MG=1: This key can be used in the GMAC instruction to generate MACs on data.
  MG=0: This key cannot be used in the GMAC instruction to generate MACs on data.
(d) MV
  MV-1: This key can be used in the VMAC instruction to verify MAC on data.
  MV=0: This key cannot be used in the VMAC instruction to verify MAC on data.
(e) ACMB
This bit indicates whether the data key can be XORed with another data key having the ACOMBKD attribute. The XORing process is done by the ACOMBKD instruction, as will be described in section "ANSI Combine KDs (ACOMBKD)." The resulting key is used to verify and generate MACs for the messages communicated via the ANSI$\times$9.17 protocol.
  ACMB=1: This data key can be combined in the ACMB instruction.
  ACMB=0: This data key cannot be combined in the ACMB instruction.

AV (Anti-Variant)

Same description as that of Privacy keys.

Software Bits (a) CV Version
Same description as that of Privacy keys.
(b) Software-Enforced Usage None.

Extension

Same description as that of Privacy keys.

Reserved Bits

Same description as that of Privacy keys.

Parity Bits

Same description as that of Privacy Keys.

Control Vector Format for Intermediate ICV

Refer to FIG. 11. The following is a detailed description of each field and subfield of this figure.

CV TYPE

CV TYPE, where the last three bits xxx of CV TYPE are set to zero but are not checked by the instructions (maintype="Intermediate ICV", subtype=Not applicable)

Export Control

Same description as that of Privacy keys. The ICV keys are normally not imported to other nodes except in the case of a hot backup. Thus, normally, this field assumes the value B'00' for an ICV control vector.

AV (Anti-Variant)

Same description as that of Privacy keys.

Software Bits (a) CV VERSION
Same description as that of Privacy keys.
(b) Software-Enforced Usage None.

Extension

Same description as that of Privacy keys.

Reserved Bits

Same description as that of Privacy keys.

Parity Bits

Same description as that of Privacy keys.

Control Vector Format for Tokens

Refer to FIG. 12. The following is a detailed description of each field and subfield of this figure.

CV TYPE

CV TYPE, where the last three bits xxx of CV TYPE are set to zero but are not checked by the instructions (maintype="Token", subtype=Not applicable).

Tokens are secret quantities used to protect the integrity of Data keys stored in the Data Keys Dataset (DKDS). Data keys are stored in the DKDS in the form token+e*KM.C1(K),e*KM.C2(token). Token control vector type is allowed in several instructions such as EMK, RTNMK and RTCMK.

Export Control

Same description as that of Privacy keys. The ICV keys are normally not imported to other nodes except in the case of a hot backup. Thus, normally, this field assumes the value B'00' for an ICV control vector.

AN (Anti-Variant)

Same description as that of Privacy keys.

Software Bits (a) CV VERSION
Same description as that of Privacy keys.
(b) Software-Enforced Usage None.

Reserved Bits

Same description as that of Privacy keys.

Extension

Same description as that of Privacy keys.

Parity Bits

Same description as that of Privacy keys.

Instruction Set

The instruction set described here is a common cryptographic function set which is implemented in the CF. There may be exceptions to this requirement; for instance, MDC can be implemented at a CFAP level. Other deviations in the instruction set implementation should be carefully considered based on security requirements and product environment.

The instruction set is based on a control vector approach. There are several fields in the control vectors which may or may not be implemented in a particular system. However, the minimum control vector checking as described here must be performed in each system in the CF. If the full crypto separation is not required or only a subset of the instruction set is sufficient for a given application, the control vector checking can be excluded for the functions not implemented in a given design. (The checking on subtype fields in the control vector, an encoded field, ensures that control vectors can not be mixed and matched in the crypto instructions using invalid combinations. This checking is crucial to security.)

The instruction set equations represent the inputs required to the function and outputs expected from the function related to a cryptographic function described. Instead of passing actual data to the function, the implementation may pass the addresses of data to the function. This addressing would depend upon the given system implementation and is not described here.

The equations describe all the parameters and data required to perform a given function. Depending upon the modes of the operation, some or all the parameters are used in the function, however, the fields in the equation have to be treated as inputs and outputs rather than the actual values of inputs and outputs as passed to the function in a given implementation. For example: the "A" field in the equation represent the data to be passed to a function, the physical form of this may be a 32 bit address pointing to the data to be fetched by the instruction from memory or to be stored to the memory. The data bus width from memory is also implementation dependent, whereas the input data to be encrypted or decrypted by crypto function operations is always a multiple of 8 bytes.

There are two fundamental ways in which CV checking can be done.

1. Test Bits in Control Vector: Test the control vector bits according to what they should be, if it does not match then set a condition code and abort the operation. For example, in ENCIPHER instruction "E" bit of the CV is tested for "1", if it is not one then the operation is aborted. For more complicated instructions, the testing is not as trivial as this, and we need to pass some parameters to specify the intent of input and output operation and the usage of control vector. For example, in generate key set (GKS), "mode" is specified to the instruction to generate a particular from of output, and the control vector checking has to be performed according to the "mode" specification.

2. Set bits in Control Vector: Set a bit in control vector as appropriate then perform the operation. This does not require any testing of control vectors. For example, in ENCIPHER instruction "E" bit is set in the control and the operation is performed. Now, each instruction has to know, what bits to set and under what conditions? This strategy may not work in all cases. For instance, how would the instruction know what is the bit setting for "target control"? This means, there has to be a parameter specified to the instruction indicating to choose a particular setting in the control vector. This approach will take away all the flexibility in the control vector specification.

Either of the above two techniques will satisfy the cryptographic requirements of the control vector checking. We have chosen the "Test bits in Control vector" approach (no bits in the control vector are set by the instruction) for the following reasons:
1. Instruction does not have to know what bits to set nor when.
2. It is very flexible to pass a parameter like "mode" and get the possible combination of outputs, and provide a combination of inputs to the instruction.
3. If the setting is hardcoded in the CF, then it is very hard to make extension to the architecture, and it is also very difficult to know all the possible combinations ahead of time.
4. It simplifies hardware implementation, and provides greater flexibility to software.
5. It preserves the intent of control vectors: Control vectors (at the present time) are used for cryptographic separation and specifically for security reasons. Control vectors are not used in CA for "specifying an operation or a function to the instruction". In other words, control vectors are not like an "extended opcode" for the instruction.

Encode (ENC)

| | |
|---|---|
| Equation | |
| KD, A -- eKD(A) | |
| Inputs: | |
| KD | 64 bit clear key |
| A | 64 bit plain text |
| Outputs: | |
| eKD(A) | 64 bit encrypted data |

Description: The encode function is used to encipher an 8 byte plain text data in ECB mode using a 64 bit clear key. No control vector is passed to this instruction.

FIG. 13 is a block diagram of this instruction.

CC:
1. successful operation
2. unsuccessful operation (error)
NOTE: Unsuccessful operation can be any hardware error specific to a given implementation. The condition codes (CC described here merely represent suggested condition codes for the instruction, however, there may be more condition codes implemented in a given system. Furthermore, the CC codes do not represent the actual condition codes that have to be passed by the function in a given implementation, the numbering used here is for a convenient description of crypto architecture.
Control Vector Checking: None.

Decode (DEC)

| | |
|---|---|
| Equation: | KD, eKD(A) -- A |
| Inputs: | |
| KD | 64 bit clear key |
| eKD(A) | 64 bit encrypted data |
| Outputs: | |
| A | 64 bit encrypted data |

Description: The decode function is used to encipher an 8 byte plain text data in ECB mode using a 64 bit clear key. No control vector is passed to this instruction.

FIG. 14 is a block diagram of this instruction.

CC:
1. successful operation
2. unsuccessful operation (error)
Control Vector Checking: None

Encipher (ENCI)

| | |
|---|---|
| Equation: | e*KM.C1(KD1), ICV, A, n, C1 --- eKD1(ICV,A) |
| Inputs: | |
| e*KM.C1(KD1) | 64 bit data key (KD1) triple encrypted under the master key (KM) with a control vector C1. |
| ICV | 64 bit plain input chaining value NOTE: Encrypted ICVs are managed by CFAP as described in the "ICV/OCV Management" and "Software Interface." If output chaining value (OCV) is required, the last 8 byte output (En) must be used as OCV, however, this is not a standard approach. Each system implementation treats the encryption and decryption of the last block differently. Refer to "Software Interface" for more details on the last block treatment and OCV generation techniques. CFAP handles all the possible last block encipherment and decipherment and also OCV management. |
| A | Data to be encrypted, in multiples of 8 byte blocks. The 8 byte blocks are A1, A2, . . . An. If the last block An is not a multiples of 8 bytes, padding should be performed by CFAP before calling this instruction. CF instructions always assume multiples of 8 bytes data as inputs and outputs. |
| n | number of 8 byte blocks to be encrypted. n should be as large as possible, however, this may be system dependent. CA does not define any maximum limit on n. For example: If number of 8 byte blocks = 10,000 and n max = 4,000, then Encipher instruction will be invoked as follows:<br>- Encipher n = 4000<br>- Encipher n = 4000<br>- Encipher n = 2000<br>Note: After each call of Encipher, the last 8 bytes enciphered data En (OCV) has to be fed back as ICV input to the next Encipher call. |
| c1 | 64 bit control vector for data key (KD1). |
| Outputs: | |
| ekD1(ICV,A) | encrypted data, n blocks, each block is 8 bytes (E1, E2 . . . En). |

Description: The input data is encrypted via the CBC mode of DEA encryption. Multiples of 8 byte blocks are encrypted by this instruction until all n blocks are encrypted.

The architecture defines only plain ICV input to the function. If encrypted ICV is required, the ICV can be encrypted using a data key (KD2) using encipher instruction. Encrypted ICV's can be decrypted using decipher instruction. All the encrypted ICV's and OCV's are managed by the CFAP program.

If the input data is not in multiples of 8 byte blocks then padding must be done. This padding has to be performed by CFAP before invoking the encipher function.

Figure 15:
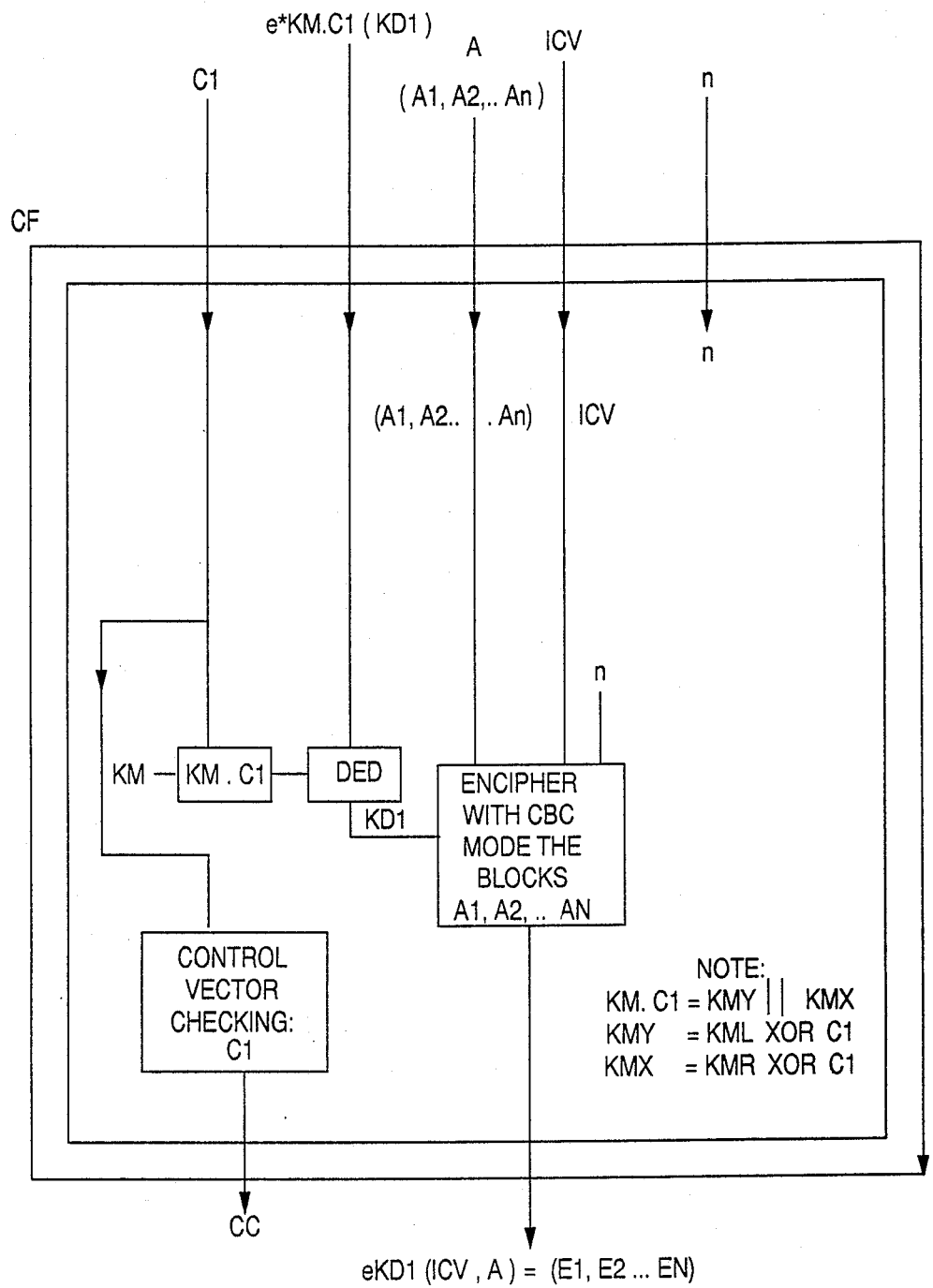
FIG. 15 is a block diagram of the encipher instruction.

FIG. 15 is a block diagram of this instruction.

CC:
1. successful operation
2. C1 is invalid
3. unsuccessful operation (error)
Control Vector Checking:

-continued

1. Checking on C1
   - cv type = "data/compatibility" or "data/privacy" or "data/ANSI"
   - E usage bit = 1
   - reserved (48:63) = X'0'

NOTE: For all the instructions described here, control vector checking implies that if the check is not passed then the instruction must be aborted and the corresponding control vector invalid condition code (CC) be turned on. If there are one or more checks to be performed on the control vectors, all the checks are performed and all the checks have to be passed to perform the operation. If any of the checks fail, the operation must be aborted.

Decipher (DECI)

Equation:
e*KM.C1(KD1), ICV, eKD1(ICV,A), n, C1 → A

Inputs:

| | |
|---|---|
| e*KM.C1(Kd1) | 64 bit data key (KD1) triple encrypted under the master key (KM) with a control vector C1. |
| ICV | 64 bit plain input chaining value. Note: Encrypted ICVs are managed by CFAP as described in the "ICV/OCV Management" and "Software Interface." If output chaining value (OCV) is required, the last 8 byte input (En) must be used as OCV, however, this is not a standard approach. Each system implementation treats the encryption and decryption of the last block differently. Refer to "Software Interface" for more details on the last block treatment and OCV generation techniques. CFAP handles all the possible last block encipherment and decipherment and also OCV management. |
| eKd1(ICV,A) | encrypted data, n blocks, each block is 8 bytes (E1, E2 ... En). |
| n | number of 8 byte blocks to be decrypted. n should be as large as possible, however, this may be system dependent. CA does not define any maximum limit on n. Note: After each call of Decipher, the last 8 bytes enciphered data En (OCV) has to be fed as input ICV to the next Decipher call. This is being managed by CFAP. For example: If number of 8 byte blocks = 10,000 and n max = 4000, then Decipher instruction will be invoked as follows: Decipher n = 4000 Decipher n = 4000 Decipher n = 2000 |
| C1 | 64 bit control vector for data key (KD1). |

Outputs:

| | |
|---|---|
| A | Plain data, in a multiples of 8 byte blocks. The 8 byte blocks are A1, A2, ... An. |

Description: The input data is decrypted via the CBC mode of DEA encryption. The multiples of 8 byte blocks are decrypted by this instruction until all n blocks are decrypted.

The architecture defines only plain ICV input to the function. If encrypted ICV is required, the CV can be encrypted using a data key (KD2) using encipher instruction. Encrypted ICV's can be decrypted using decipher instruction. All the encrypted ICV's and OCV.='s are managed by the CFAP.

FIG. 16 is a block diagram of this instruction.

CC:
   1. successful operation
   2. C1 is invalid
   3. unsuccessful operation (error)

Control Vector Checking
1. Checking on C1

- cv type = "data/compatibility" or "data/privacy" or "data/ANSI"
   - D usage bit = 1
   - reserved (48:63) = X'0'

GENMAC (GMAC)

Equation:
e*KM.C1(KD2=1),[e*KM.C2(KD2)], ICV[e*KM.C3(OCV)],
A, n, icv-type, output-type, mac-enc, C1,[C2],[C3]
→ MAC (64 bit)
or
e*KM.C3(OCV)

Inputs:

| | |
|---|---|
| e*KM.C1(KD1) | KD1 is a MAC generation key for single encrypting MAC, triple encrypted under KM with a control vector C1. |
| e*KM.C2(KD2) | KD2 is an optional MAC generation key for triple encrypting MAC, triple encrypted under KM with a control vector C2. This is an optional input required for triple encrypting mac output if mac-enc = 1. |
| ICV | ICV equal to zero is the default Initial Chaining Value, and is standard to CA architecture, ANSI X9.9 and ANSI X9.19. Non-zero plain ICV can also be used to be compatible with systems which require plain ICV input. Encrypted ICV input is not supported by CA as it was found that it does not provide any more security for the function. Encrypted intermediate ICVs are supported by CA. Note: Encrypted ICVs if required are managed by CFAP as described in the ICV/OCV Management" and "Software Interface." |
| e*KM.C3(OCV) | This is a 64 bit intermediate ICV encrypted under the master key with a special control vector C3. This is an optional input which must be provided if large blocks of data (/n) are used to generate MAC. Decrypting the ICV is done internal to the function. Intermediate OCV can not be shipped from the local node, as it is stored under the master key with a control vector in the form for local use only. |
| A | Data to be MAC'd, in multiples of 8 byte blocks (A1, A2 ... An). |
| n | number of 8 byte blocks to be MAC'd. n should be as large as possible, however, this may be system dependent. CCA does not define any maximum limit on n. If large number of blocks have to be MAC'd then GMAC is invoked multiple number of times until all blocks are complete. For example: If n max is 4000 for the system, and the data to be MAC's are 10,000 8 byte blocks, then GMAC is invoked as follows: GMAC n=4000,output-type=1,icv-type=0 GMAC n=4000,output-type=1,icv-type=2 GMAC n=2000,output-type=1,icv-type=2 Note: After each call of GMAC, the intermediate ICV e*KM.C3(OCV) must be fed back to next GMAC call as ICV input. The decryption of this intermediate ICV must be done internally in the CF |
| icv-type | icv-type indicates whether the ICV passed to the function is zero, plain, or intermediate. Intermediate ICV is triple encrypted under the master key with a control vector C3. Zero ICV is a default value. 0: zero ICV (default) 1: plain ICV 2: intermediate ICV (OCV) |
| output-type | indicates the stage of the mac generation process to the instruction. 0: MAC output 1: Intermediate ICV output (OCV) |
| mac-enc | mac-enc indicates a single or triple encryption mac output 0: single encrypting mac output 1: triple encrypting mac output(ANSI 9.19 requirement) |

-continued

| C1,C2,C3 | 64 bit control vectors for KD1, KD2, and OCV respectively. C2 and C3 are optional inputs to the instruction, C2 must be input if mac-enc=1, and C3 must be input if icv-type = 2 or output-type=1. |
|---|---|
| Outputs: | |
| MAC | is a 64 bit output, resulted from the single encryption or triple encryption of the final input block of data, depending upon mac-enc parameter. This output is valid only if output-type=0. |
| e*KM.C3(OCV) | OCV is a 64 bit intermediate ICV triple encrypted under KM with control vector C3. This output is valid only if output-type=1. MAC output and Intermediate OCV outputs both must not be output at the same time for security reasons. |

Description: The input data is encrypted with CBC mode of DEA encryption, and the final block of encrypted data is output. There are two modes, the single encryption mode and triple encryption mode. With the single encryption mode, a single key KD1 is used to create the MAC. In the triple encryption mode, the single encryption mode is employed with KD1 to create a MAC, except the MAC is then decrypted with KD2, and reencrypted again with KD1 to produce the final 64 bit MAC.

The instruction outputs 64 bit MAC, however, X9.9 specifies 32 bit MAC which is 32 left most bits of the 64 bit MAC output. CFAP has to extract the appropriate MAC bits from the 64 bit MAC output.

ICV is zero as a standard and optionally can be a plain or intermediate ICV to GMAC instruction. If encrypted ICV's are required then CFAP must encrypt ICV under (KDS) and must pass a plain ICV to the GMAC instruction. The ANSI X9.9 MAC standard specifies a zero ICV for the first block and thus is defined here as a standard input. However, architecture provides plain and intermediate inputs to satisfy every possible need of MAC generation.

If MAC generation is required for the blocks greater than n, intermediate ICV option must be used to generate MAC. This requirement provides additional security by not exposing intermediate ICVs in clear.

If the data block is not multiples of 8 byte blocks, padding must be done. The padding has to be performed by the CFAP before invoking this function. MAC computation must be for the binary data as specified by the ANSI X9.9-1986 section 5.0 and Coded character sets authentication if needed must be implemented by CFAP.

Figure 17:
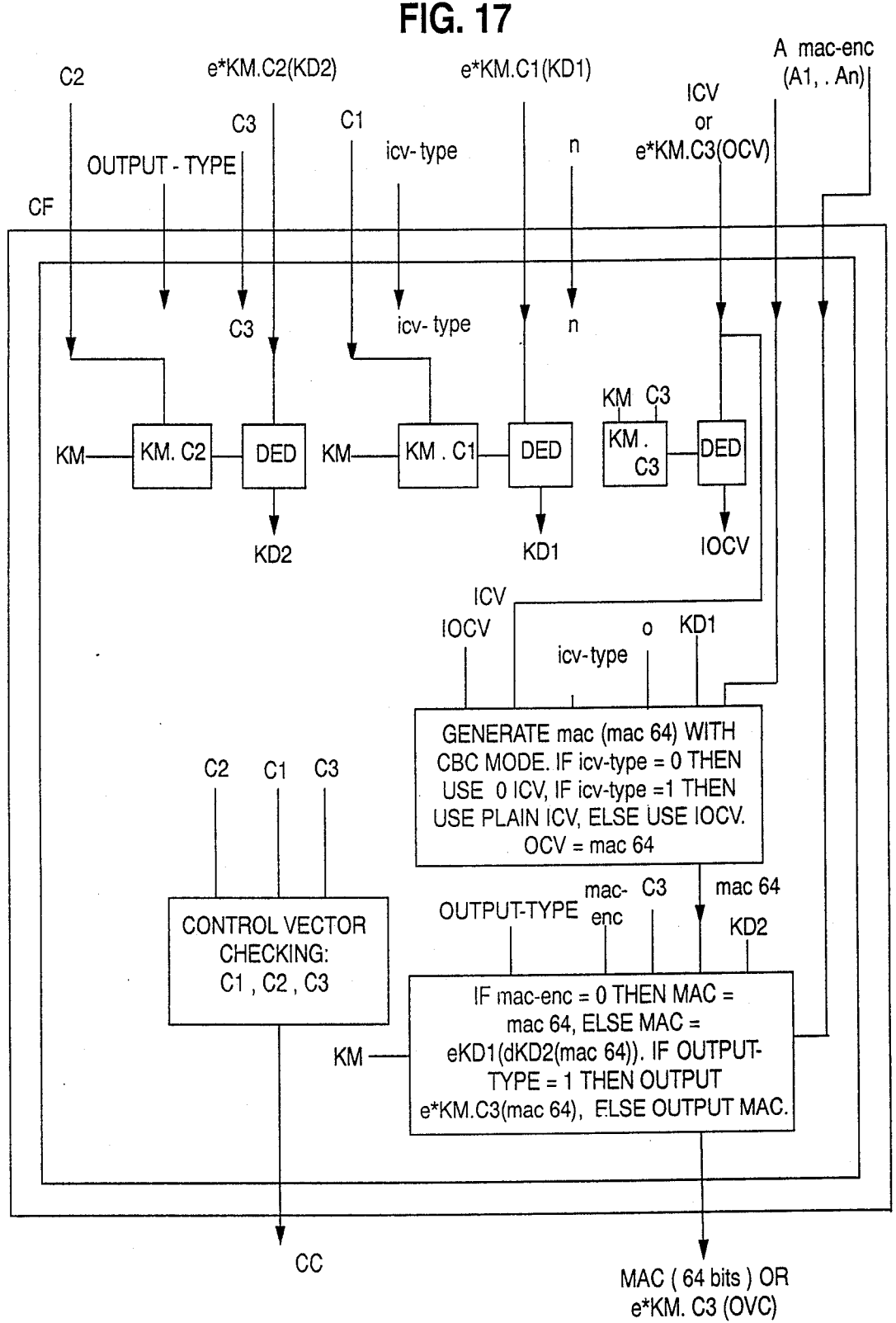
FIG. 17 is a block diagram of the generate message authentication code (Genmac) instruction.

FIG. 17 is a block diagram of this instruction.

CC:
1. successful operation
2. C1 is invalid
3. C2 or C3 is invalid
4. unsuccessful operation (error).
Control Vector Checking:
1. Checking on C1
   - CV type = "data/compatibility" or "data/mac" or "data/ANSI"
   - MG usage bit = 1
   - reserved (48:63)=X'0'
2. Checking on C2 if (mac-enc = 1).
   - cv type = "data/compatibility" or "data/mac" or "data/ANSI"
   - MG usage bit = 1
   - reserved 48:63) = X'0'
3. Checking on C3 if (icv-type=2 OR output-type = 1).
   - CV type = "Intermediate ICV"

Verify MAC (VMAC)

Equation:
e*KM.C1(KD1), [e*KM.C2(KD2)]
ICV[e*KM.C3(OCV)],
A,MAC, n, icv-type,output-type,mac-enc,mac-len, C1, [C2],[C3]
----- yes/no
OR
e*KM.C3(OCV)

| Inputs: | |
|---|---|
| e*KM.C1(KD1) | KD1 is a mac verification key for single encrypting mac, triple encrypted under KM with a control vector C1. |
| e*KM.C2(KD2) | KD2 is a mac verification key for triple encrypting mac, triple encrypted under KM with a control vector C2. This is an optional input required for triple encrypting mac output if mac-enc=1. |
| ICV | ICV equal to zero is the default Initial Chaining Value, and is standard to CA architecture,ANSI X9.9 and ANSI X9.19. Non-zero plain ICV can also be used to be compatible with systems which require plain ICV input. Encrypted ICV input is not supported by CA as it was found that it does not provide any more security for the function. Encrypted intermediate ICVs are supported by CA. NOTE: Encrypted ICVs if required are managed by CFAP as described in the "ICV/OCV Management" and "Software Interface." |
| e*KM.C3(OCV) | This is a 64 bit intermediate ICV encrypted under the master key with a special control vector C3. This is an optional input must be provided if large blocks of data (] n) are used to verify MAC. Decrypting the ICV is done internal to the function. Intermediate OCV can not be shipped from the local node, as it is stored under the master key with a control vector in the form for local use only. The intermediate ICV's must be secret in the MAC verification process to protect from attacks. |
| A | Data used in MAC, in multiples of 8 byte blocks (A1,A2 ... An). |
| MAC | 64 bit MAC input to the instruction either single or triple encrypted. By default, only left most 32 bits of this MAC are used for MAC comparison. mac-len may be used to explicitly specify other comparison lengths. |
| n | number of 8 byte blocks MAC'ed. n should be as large as possible, however, this may be system dependent. If large number of blocks have to be mac verified then VMAC is invoked multiple number of times until all blocks are complete. For example: if n max is 4000 for the system, and the data to be verified are 10,000 8 byte blocks, then VMAC is invoked as follows: NOTE: After each call of VMAC, the intermediate ICV e*KM.C3(OCV) must be fed back to next VMAC call as ICV input. The decryption of this intermediate ICV must be done internally in the CF. VMAC n=4000,output-type=1,icv-type=0 VMAC n=4000,output-type=1,icv-type=2 VMAC n=2000,output-type=0,icv-type=2 |
| icv-type | icv-type indicates whether the ICV passed to the function is zero, plain, or intermediate. Intermediate ICV is triple encrypted under the master key with a control vector C3. 0: zero ICV (default) 1: plain ICV 2: intermediate ICV (OCV) |
| output-type | indicates the stage of the mac verification process to the instruction 0: MAC Verification output 1: Intermediate ICV output (OCV) |
| mac-enc | mac-enc indicates a single or triple encryption mac input. |

Figure 18:
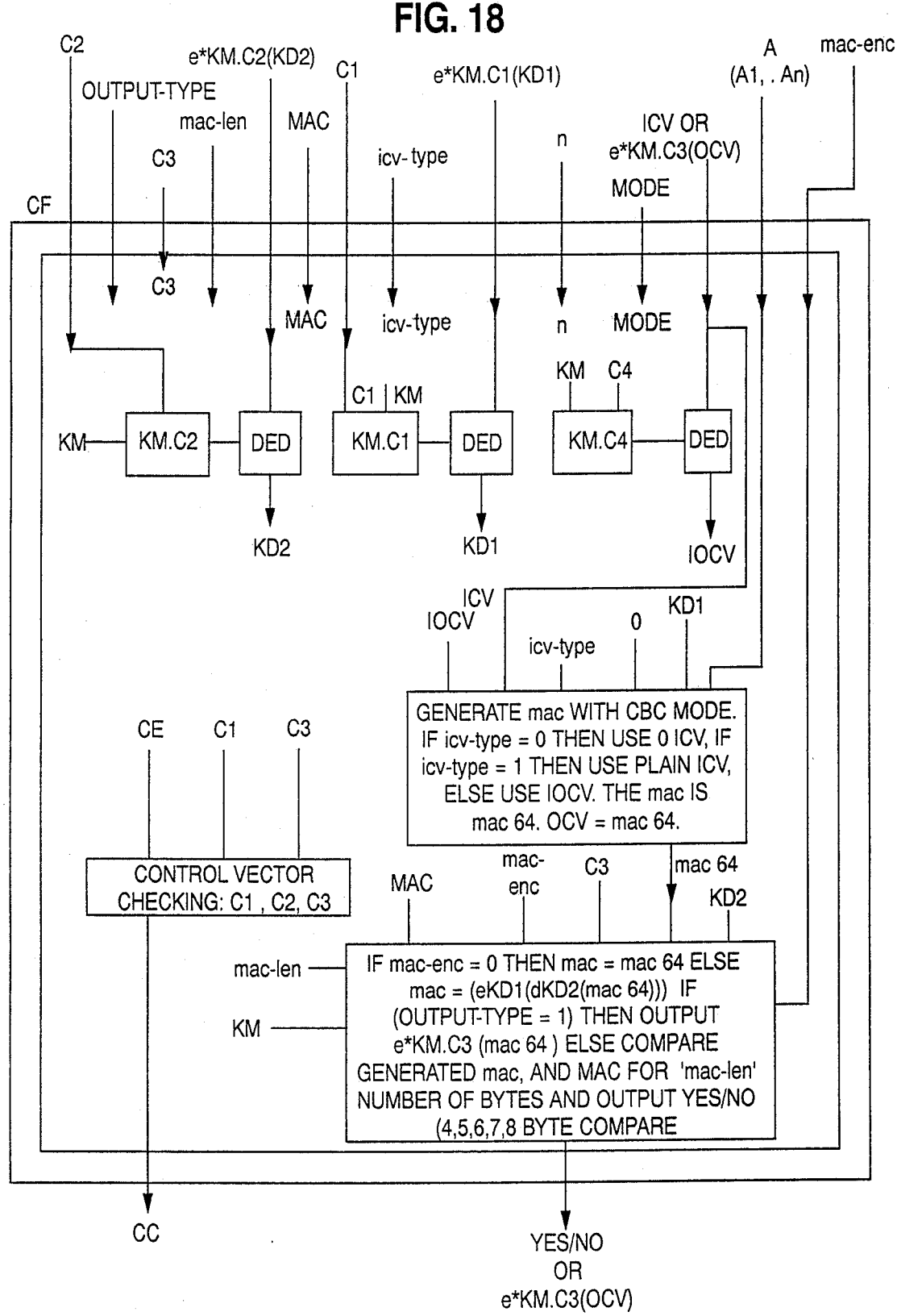
FIG. 18 is a block diagram of the verify message authentication code (Vermac) instruction.

|  |  |
|---|---|
| | 0: single encrypting mac input |
| | 1: triple encrypting mac input (ANSI 9.19 requirement) |
| mac-len | mac-len specifies the number of bytes of the mac to be compared. 4 left most bytes are compared as a default. |
| | 0: 4 left most bytes |
| | 1: 5 left most bytes |
| | 2: 6 left most bytes |
| | 3: 7 left most bytes |
| | 4: 8 bytes |
| | NOTE: provision of 4, 5, 6, 7, 8 byte MAC verification may subvert MAC generation process for 8 byte MAC. We do not have any solution to solve this problem in crypto facility, but CFAP may consider some checking for different length MAC verification. Further investigation is needed for this problem. |
| C1,C2,C3 | 64 bit control vectors for KD1, KD2, and OCV respectively. C2 and C3 are optional inputs to the instruction, C2 is required if mac-enc=1, and C3 is required if icv-type=2 or output-type=1. |
| Outputs: | |
| yes/no | mac is verified or not. |
| e*KM.C3(OCV) | OCV is a 64 bit intermediate ICV triple encrypted under KM with control vector C3. This is an optional output valid for output-type=1. |
| Description: | The input data is encrypted with CBC mode of DEA encryption using data key KD1 and 32 left most bits of the final encrypted block are compared for equality with the supplied MAC.32 bit MAC compare is a default value, and other comparisons must be made as specified by the mac-len parameter. CC = 1 is set for macs equal and CC=2 is set if macs are not equal. There are two encryption modes: single encryption mode, a single key KD1 is used to create the MAC. In the triple encryption mode, the single encryption mode is employed with KD1 to create a MAC, except the MAC is then decrypted with KD2, and reencrypted again with KD1 to produce the final 64 bit MAC. The MAC is generated as specified by mac-enc input and then compared with the supplied mac to the function. The first ICV is zero as a standard and optionally can be plain. Intermediate ICV must be used if the mac'd data is greater than n blocks in length. If the data block is not multiples of 8 byte blocks, padding must be done. The padding has to be performed by the CFAP before invoking this instruction. FIG. 18 is a block diagram of this instruction. | cc:
1. MACs equal
2. MACs not equal
3. C1 is invalid
4. C2 or C3 is invalid
5. unsuccessful operation (error).

Control Vector Checking:
1. Checking on C1
   - cv type = "data/compatibility" or "data/mac" or "data/ANSI"
   - MV usage bit = 1
   - reserved (48:63)=X'0'
2. Checking on C2 if (mac-enc = 1).
   - cv type = "data/compatibility" or "data/mac" or "data/ANSI"
   - MG usage bit = 1
   - reserved 48:63) = X'0'
3. Checking on C3 if (icv-type=2 OR output-type=1).
   - CV type = "Intermediate ICV"

Translate Cipher Text (TCTXT)

Equation: e*KM.C1(KD1),ICV1,eKD1(ICV1,A), e*KM.C2(KD2),ICV2, n, C1, C2
---- eKD2(ICV2,A)

Figure 19:
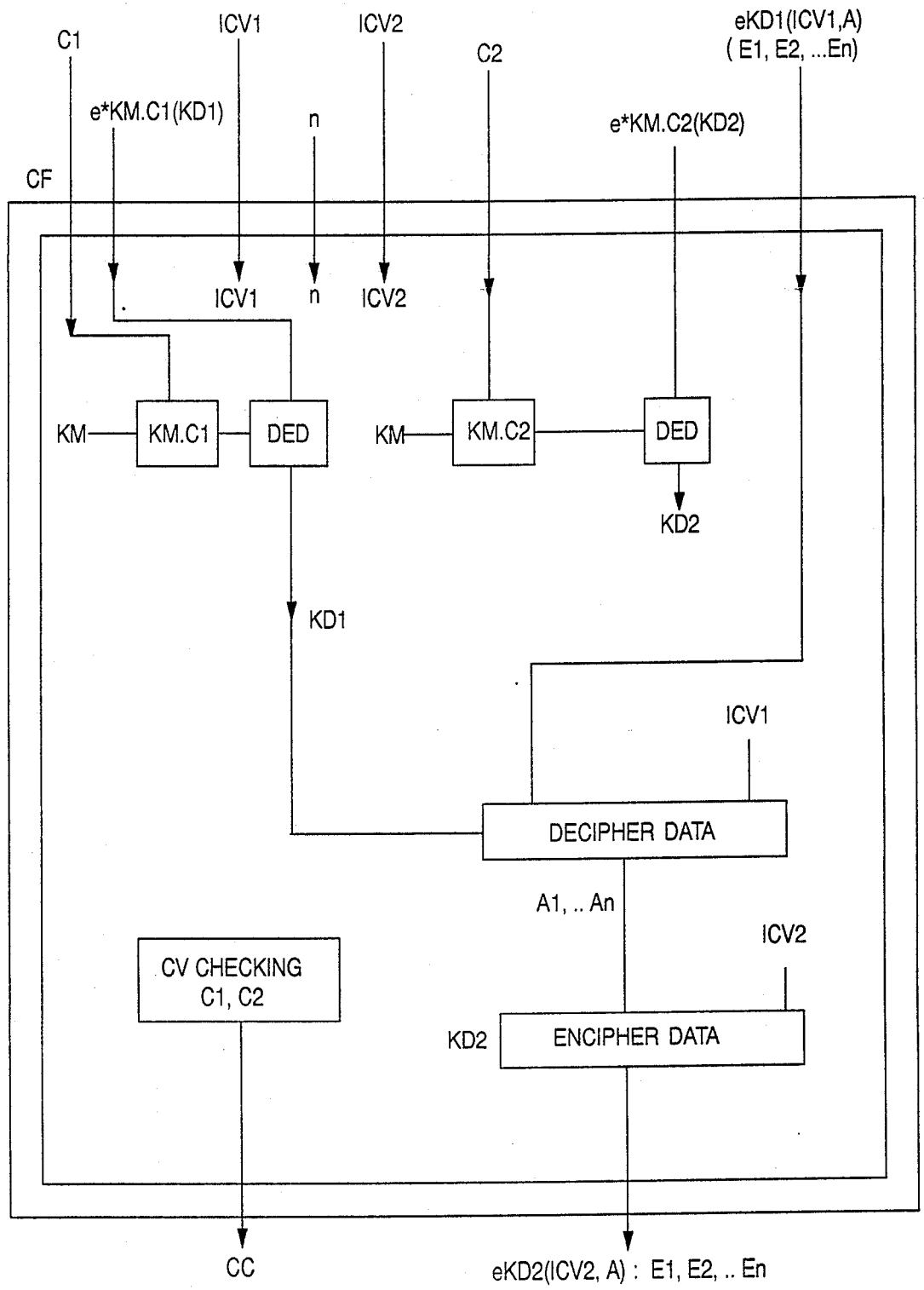
FIG. 19 is a block diagram of the translate cipher text instruction.

| Inputs: | |
|---|---|
| e*KM.C1(KD1) | KD1 is an input data key, triple encrypted under KM with a control vector C1. |
| ICV1 | 64 bit clear ICV. |
| eKD1(ICV1,A) | KD2 is an output data key, triple encrypted under KM with a control vector C2. |
| ICV2 | 64 bit clear ICV. |
| n | Number of 8 byte blocks of data to be translated. |
| C1, C2 | Control vectors for KD1, KD2 respectively. |
| Outputs: | |
| eKD2(ICV2,A) | outputs Data A encrypted with data key KD2 using ICV2. |
| Description: | Translate cipher text instruction translates data from one data key and ICV to another data key and ICV. This instruction operates with data/xlt keys, and data/compatibility keys. CV keys or CV=0 keys can be used to translate data, no mix and match of these key types are permitted by this instruction. The data can be up to n 8 byte blocks, the translation is done in the crypto facility without exposing the clear data outside the crypt facility. The ICV inputs ICV1 and ICV2 can only be plain ICV inputs to the instruction. No intermediate ICV is provided by the instruction. If more than n blocks of data have to be translated, and the data has to be chained then CFAP has to pass the last 8 byte encrypted block(En) as input to ICV. If encrypted ICVs are used then CFAP must decipher the ICVs before passing ICVs to the instruction. NOTE: The xlate Ciphertext instruction is specifically designed to operate with CV-only keys (i.e., xlate data keys). There is no compatibility mode xlate ciphertext option offered. To get around this, the xlate ciphertext instruction will accept data keys with the D and E attributes as well as the XDin and XDout attributes. But this is provided as a service to reduce the accidental exposure of clear data, since an insider adversary could recover data unclear using the decipher instruction. It is not possible to isolate the xlate ciphertext keys in the compatibility mode, and to architect a control vector for this would give an illusion of security, when in fact, an attack could be perpetrated with the RTMK instruction by importing an intended xlate key (sent over CV=0 channel) as a decipher key. Thus, the xlate ciphertext data channel could be subverted by deciphering data sent over that channel. FIG. 19 is a block diagram of this instruction. |

CC:
1. successful operation
2. C1 or C2 is invalid
3. unsuccessful operation (error)

Control Vector Checking:
1. Checking on C1
   - cvy type = "data/xlt" or "data/compatability"
   - If (cv type = "data/xlt") then XDin = 1
   - reserved (48:63)=X'0'
2. Checking on C2 if (mac-enc=1).
   - cv type = "data/lxt" or "data/compatability"
   - If (cv type = "data/xlt") then XDout = 1.
   - reserved 48:63) =X'0'
3. Checking on C1 and C2
   - CV type(C1) = "cv type (C2)

MDCOP (MDC OPERATION)

DESCRIPTION: It is within the skill of the art to provide an instruction which calculates a Modification Detection Code (MDC) as described in copending patent application entitled "Data Authentication Using Modification Detection Codes Based on a Public One-Way Encryption Function," by B. O. Brachtl, et al., Ser. No. 90,633, filed Aug. 23, 1987, and assigned to IBM Corporation, and incorporated herein by reference.

ICV/OCV Management

An initial chaining value (ICV) is a 64 bit random, pseudorandom, or, in some cases, nonrepeating value used with the cipher block chaining (CBC) mode of encryption of the DEA and with some algorithms for calculating message authentication codes (MACs).

ICV management includes options for electronic transmission and local storage of both plain and encrypted ICVs. However, encrypted ICVs must first be decrypted before being used as input parameters to any of the cryptographic functions.

An output chaining value (OCV) is a 64 bit value returned, under certain conditions, by the GENMAC and VERMAC cryptographic instructions. The same cryptographic instruction is again called and the OCV is passed as the ICV. The OCV is always encrypted in the form eKM.CV(OCV), where CV is a control vector for intermediate ICV. For the VERMAC instruction, an encrypted OCV is absolutely essential for reasons of security. A plain OCV, in this case, could be used to reveal MACs, which is something that the VERMAC instruction is not supposed to do. An encrypted OCV is also defined for the GENMAC instruction. This is done so that the GENMAC and VERMAC instructions are made as similar as possible, thus allowing for possible function overlap in hardware.

ICV Management Outside the Cryptographic Facility

The Communication Architecture permits the following three modes of electronic transmission of the ICV:
1. Plain ICV: sent in the clear.
2. Encrypted ICV: encrypted with a data key (KD) shared between the sender and receiver.
3. Private Protocol: ICV established using a private protocol between sender and receiver.

Under the CA, CFAP must handle both plain and encrypted ICVs. Although, applications may elect to manage their own encrypted ICVs thus passing plain ICVs to CFAP to encrypt ICVs for transmission and to decrypt all encrypted ICVs received from other nodes. Optionally, the cryptographic support program may also establish ICVs using a private protocol.

ICV Management Inside the Cryptographic Facility

Control vectors are not used for the electronic distribution of IDVs, nor are there any bits in the control vector that may be used by the cryptographic facility (hardware) to control ICV distribution. There is no checking or enforcement by the cryptographic facility of the mode of ICV distribution. Thus, ICV management is strictly a function of the cryptographic support program (i.e., software external to the cryptographic facility).

All ICV's passed as cryptographic function input parameters to the cryptographic facility must be plain ICVs. ICV=0, which is required by the GENMAC and VERMAC instructions, is just a subcase of Plain ICV. The affected cryptographic instructions are these:
1. Encipher
2. Decipher
3. Genmac
4. Vermac
5. Translate Cipher Text

| Acronyms and Abbreviations | |
|---|---|
| CC | Condition code |
| CA or CCA | Cryptographic Architecture |
| CV | Control Vector (nothing to do with ICV or OCV) |
| CBC | Cipher Block Chaining. An encryption mode of the Data Encryption Standard. |
| DED | Decipher, Encipher and Decipher |
| DEA | Data Encryption Algorithm |
| DES | Data Encryption Standard |
| ECB | Electronic Code Book. An encryption mode of DES. |
| EDE | Encipher, Decipher and Encipher |
| ICV | Input Chaining Value (Nothing to do with CV) |
| KDx | Data Key (x = integer) |
| KEKx | Key Encrypting Key (x = integer) |
| KM | Master Key |
| KMN | New master key |
| KMO | Old master key |
| KPEx | Pin Encrypting Key (x = integer) |
| KPGx | Pin Generation Key (x = integer) |
| KPVx | Pin Validation Key (x = integer) |
| KKNI | Immediate notarized key, 128 bits |
| KKNIL | Left 64 bits of KKNI |
| KKNIR | Right 64 bits of KKNI |
| KDmac | Temporary MAC key for ANSI message |
| MAC | Message Authentication Code |
| MDC | Modification Detection Code |
| OCV | Output Chaining Value |
| PIN | Personal Identification Number (used with ATMs) |

Algorithms

Encode and Decode Algorithm

Figure 20:
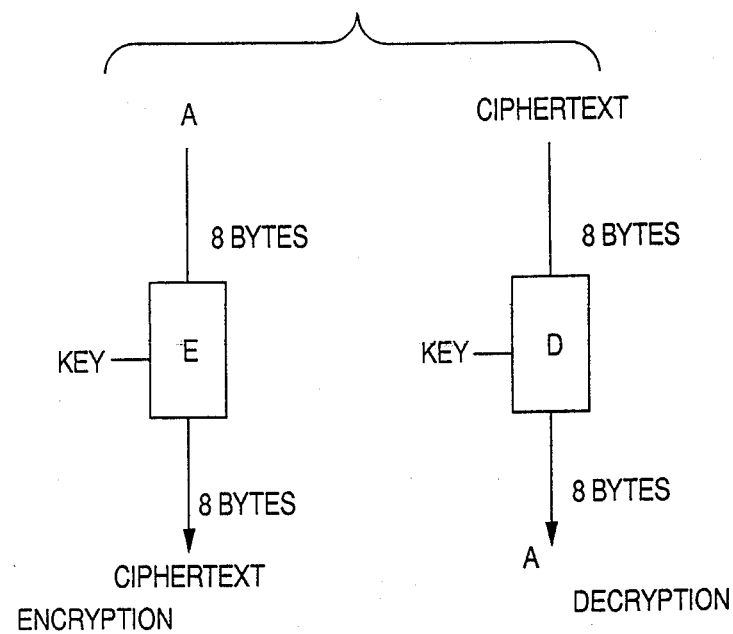
FIG. 20 shows the electronic code book (ECB) mode of DES encryption.

The Encode and Decode instructions use the ECB (Electronic Code Book) mode of the DES. There is no chaining or feedback in this mode. FIG. 20 illustrates the operation of the ECB mode of encryption and decryption.

Cipher Algorithm

Figure 21:
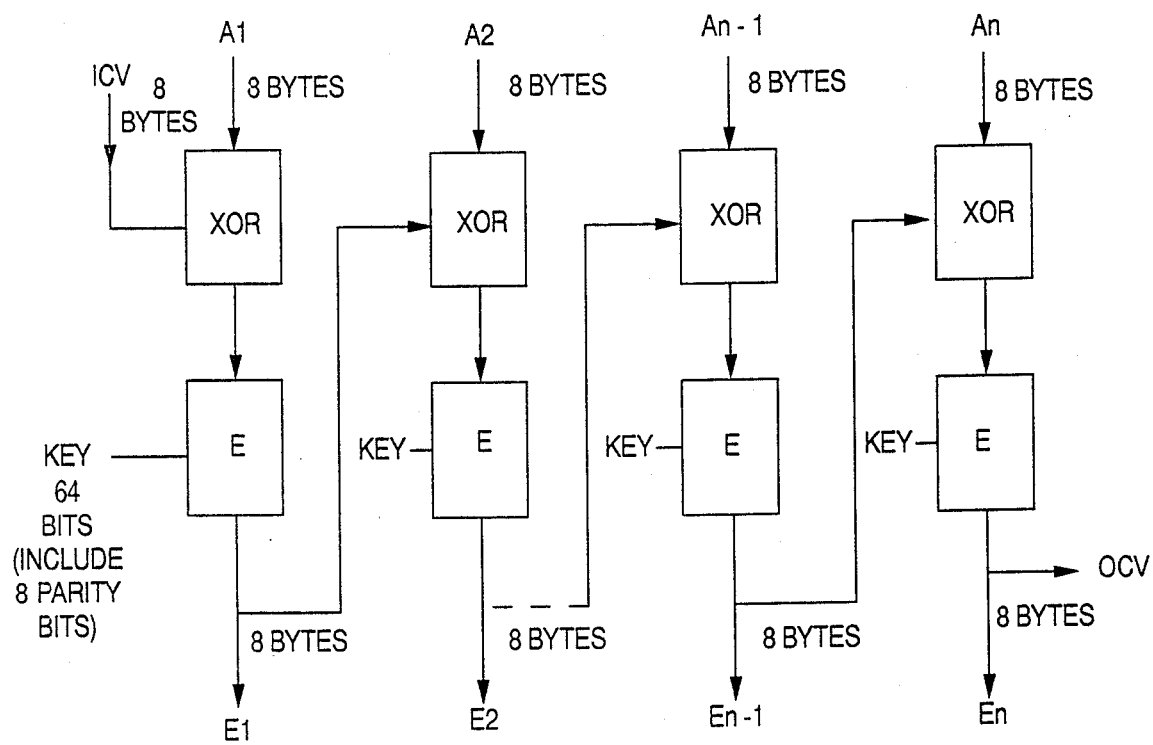
FIG. 21 shows the cipher block containing (CBC) mode of DES encipherment.
Figure 22:
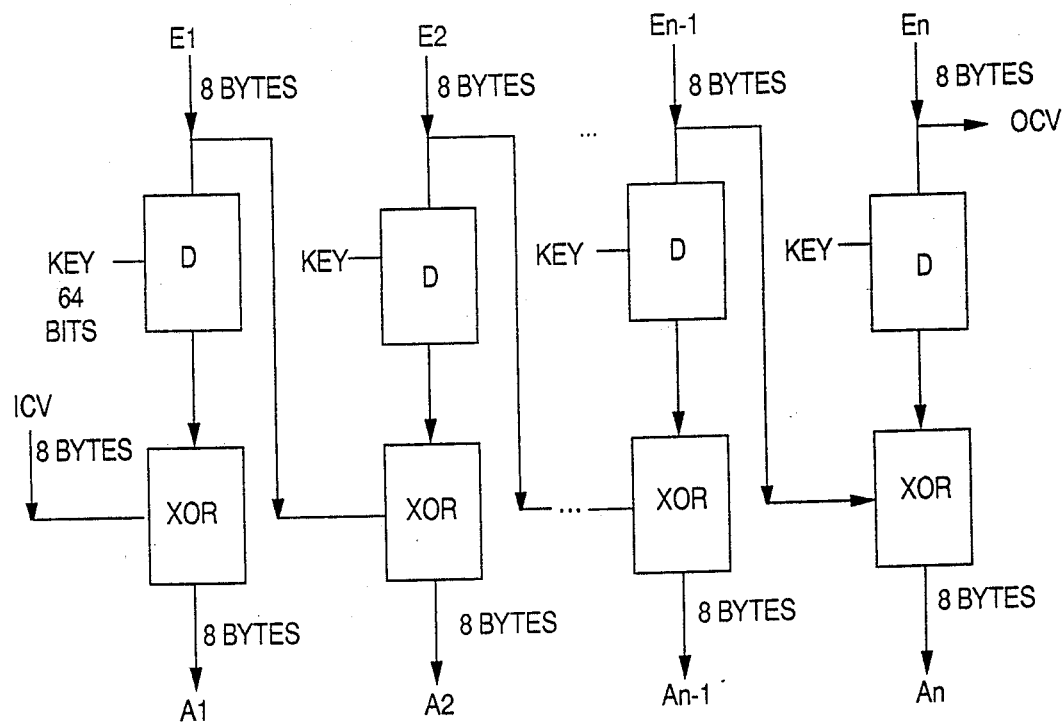
FIG. 22 shows the CBC mode of DES decipherment.

The Enciphering/Deciphering Algorithm is the National Bureau of Standards Data Encryption Standard (DES) or equivalently the American National Standards Institute Data Encryption Algorithm (ANSI DEA) X9.92-1981. Cipher Block Chaining (CBC) is done as specified in ANSI Cryptographic Modes of Operation X9.106-1983. FIGS. 21 and 22 show the CBC mode of operation of Encipher and Decipher operations respectively.

Message Authentication (MAC)

The Financial Institution Message Authentication Standard (Wholesale ANSI X9.9) as referenced in References (6), defines a process for authentication of messages from originator to recipient. This process is independent of communication media an and payment systems.

The authentication process includes the computation, transmission, and verification of a Message Authentication code (MAC). The MAS=C is based on either of the complete message text or a selected message elements of the text. The MAC is added to the message by the originator and is transmitted to the recipient. The message or message elements are accepted as authentic by the recipient if the same algorithm and secret key produce a MAC identical to the received MAC. The security of the authentication process is directly dependent on the security afforded to the secret key.

Figure 23:
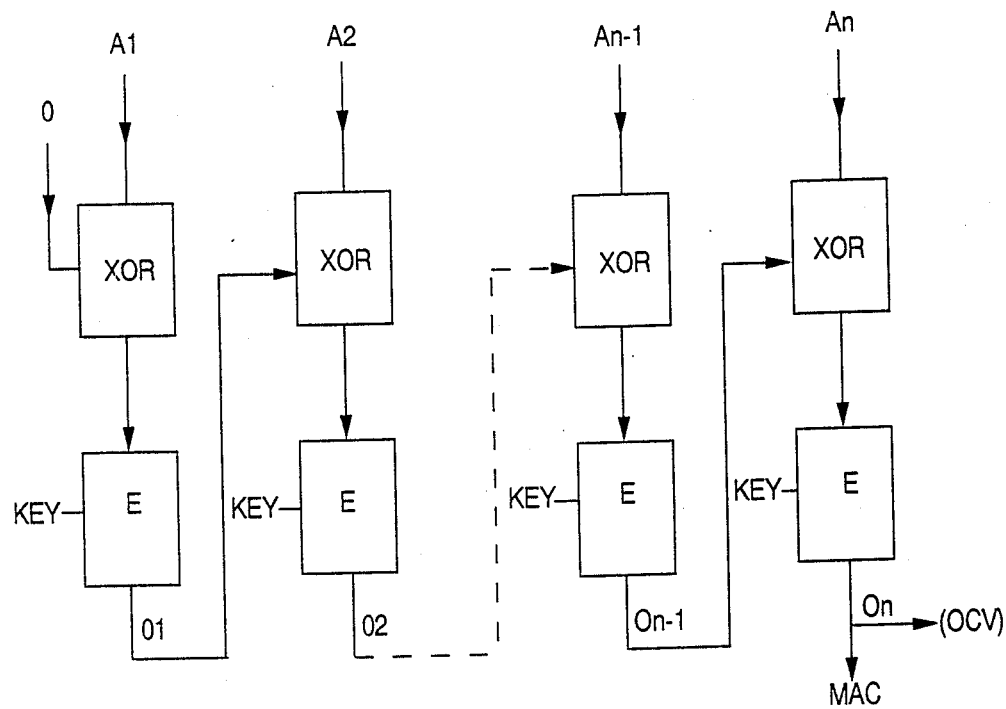
FIG. 23 shows the message authentication (MAC) algorithm.

The MAC is generated as shown in FIG. 23. The authentication algorithm as described in this standard may be implemented using either the 64 bit CBC or CFB modes of operation as described in ANSI X3.106-1983. Both modes shall be initialized so as to produce equivalent MAC's. KEY is a 64 bit key, and A1 thru An are 64 bit data blocks. Initial chaining value is '0' in this standard and CBC mode of operation should be implemented as shown in FIG. 23. If An is less than 64 bits, then '0's are appended (padded) to the right of the remaining bits. The left most 32 bits of (on) are taken as the MAC.

Note: The capability should exist to generate and to process 48 to 64 bit MAC's. For these cases, the left most 48 bits or the entire final output (On) are taken as the MAC.

The algorithm describes the MAC generation for binary data. Message authentication for "Coded Character Sets" should be implemented as described in the ANSI X9.9-1986, the MAC algorithm is invoked after the characters are represented in binary data.

MDC Algorithms

The principles of modication detection codes are described in the copending U.S. patent application by Bruno Brachtl, et al., Ser. No. 090,633, filed Aug. 28, 1987 entitled "Data Authentication Using Modification Detection Codes, Based on a Public One-Way Encryption Function," assigned to IBM Corporation and incorporated herein by reference.

Two MDC algorithms exist:
1. MDC_2—Two encipherments per 8 byte input data block
2. MDC_4—Four encipherments per 8 byte input data block Two different algorithms allow the invoker to trade a 50% performance improvement for a slight decrease in security depending on his applications.

MDC_2 (text)

1. Pad the input text with X'FF' to a multiple of 8 bytes.
2. Partition the input text into [n] 8 byte blocks T8[1] to T8[n].
3. If n=1 then set n=2 and T8[2]=8 bytes of x'00'.
4. Set initial values of KD1 and KD2 (see below).
5. For [i]=1,2, . . . ,n:
    a. MDCOP (KD1,KD2,T8[i],T8[i]
    b. KD1:=OUT1
    c. KD2:=OUT2
    d. end of FOR loop
6. Output of MDC_2 is the 16 byte MDC:=(KD1//KD2).

MDC_4 (text)

1. Pad the input text with X'FF' to a multiple of 8 bytes.
2. Partition the input text into [n] 8 byte blocks T8[1] to T8[n]
3. If n=1 then set n=2 and T8[2]=8 bytes of x'00'
4. Set initial values of KD1 and KD2 (see below)
5. For [i]=1,2, . . . ,n:
    a. MDCOP(KD1,KD2,T8[i],T8[i])
    b. KD1int:=OUT1
    c. KD2int:=OUT2
    d. MDCOP(KD1int,KD2int,KD2,KD1)
    e. KD1:=OUT1
    f. KD2:=OUT2
    g. end of FOR loop
6. Output of MDC_4 is the 16 byte MDC:=(KD1//KD2)

The initial values of KD1 and KD2 are as follows:
1. KD1:=X'5252525252525252'
2. KD2:=X'2525252525252525'

Notarization Algorithms

Using KK

Let KK be the key which is to be used to compute the notarization key. Then:

KKR=KK+FM1 (+ is exclusive or operation, and FM1 is first 8 bytes of from ID)

KKL=KK+TO1 (TO1 is the first 8 bytes of to ID)

NS1=eKKR(T02) T02 is the second 8 bytes of to ID)

NSr=eKKL(FM2) FM2 is the second 8 bytes of from ID)

NS=(left most 32 bits of NS1)//right most 32 bits of NSr)+CT (CT is a 64 bit counter associated with KK)

KN=KK+NS

KN is a notarized key used to encrypt either a KD or KK.

Using *KK

Let *KK be the key which is to be used to computer the notarization key. Then:

*KK=KK1//KKr

KKR=KKr+FM1 (+ is exclusive or operation, and FM1 is first 8 bytes of from ID)

KKL=KK1+T01 (T01 is the first 8 bytes of to ID)

NS1-eKKR(T02)+CT (T02 is the second 8 bytes of to ID and CT is a 64 counter associated with *KK)

NSr=eKKL(FM2)+CT (FM2 is the second 8 bytes of from ID)

*KN=(KK1+NS1)//(KKr+NSr)

*KN is a notarized key used to encrypt either a KD or (*)KK.

Standards and Definitions

Standards

ANSI X2.92-1981 "Data Encryption Algorithm".

ANSI X9.106-1983 "Modes of DEA Operation".

ANSI X9.2-198X "Interchange Message Specification for Debit and Credit Card Message Exchange Among Financial Institutions". This standard specifies a common interface by which bank card originated messages relating to a financial transaction may be interchanged between private systems. It specifies message structure, format and content, data elements and values for data elements.

ANSI X9.8-1982 "American National Standard for Personal Identification Number (PIN) Management and Security". This standard establishes standards and guidelines for the management and security of the Personal Identification Number's (PIN's) life cycle.

ANSI X9.9-1986 "American National Standard for Financial Institution Message Authentication (Wholesale)". This standard established a method to authenticate financial messages (wholesale), including fund transfers (e.g. wire transfers), letters of credit, security transfers, loan agreements and foreign exchange contracts.

ANSI X9.17-1985 "Financial Institution Key Management (Wholesale)". This standard establishes methods (including the protocol) for the generation, exchange and use of cryptographic keys of authentication and encryption.

ANSI X9.19-198X "Financial Institution Retail Message Authentication". This standard establishes a method to authenticate financial messages for retail transactions.

ANSI X9.23-198X "Encryption of Wholesale Financial Messages". This standard established a method to encrypt wholesale financial messages in order to provide confidentiality (e.g., wire transfers, letters of credit, etc.)

ISO DIS 8583 "Bank Card Originated Messages—Interchange Message Specifications—Content for Financial Transactions". This international standard specifies a common interface by which bank card originated messages relating to a financial transaction may be interchanged between private systems. It specifies message structure, format and content, data elements and values.

ISO DIS 8720 "Message Authentication"

ISO DP 8730 "Banking—Requirements for Standard Message Authentication (wholesale)". This international standard specifies a technique for protecting the authenticity of messages passing between financial institutions by means of a Message Authentication Code (MAC).

ISO DP 8731 "Banking—Approved Algorithms for Message Authentication—Part 1: DES-1 Algorithm". This part of ISO 8731 deals with the Data Encryption Algorithm (DEA-1) as a method for use in the calculation of the Message Authentication Code (MAC). Part-2 Other non DEA Algorithms ISO DP 8732 "Banking—Key Management Wholesale" This international standard specifies methods for the management of keying material used for the encryption and authentication of messages exchanged in the course of wholesale financial transactions.

ISO DP 9546 "Personal Identification Number Management and Security Part 1—PIN Protection Principles and Technique" This standard specifies the minimum security measures required for effective PIN management. Standard means of interchanging PIN data are provided.

Instructions and Macros Summary Chart

FIG. 24 summarizes the equations for each of the data instructions.

Operation of the Invention

The operation of the invention can be described as it carries out several cryptographic data management functions.

These data management functions make use of the encipher, decipher, generate MAC, verify MAC and translate ciphertext instructions. Operationally, these instructions require, besides data, key and control vector parameters, an initial chaining value (ICV). However, since the ICV is of secondary importance in explaining the data management functions, as a convenience ICVs are omitted from the discussion. However, the reader will appreciate that the originator of ciphertext and MACs will also be required to generate, use, and communicate ICVs to other communicants in order that the cryptographic instruction will operate consistently and in conformance to their defined, architected interfaces. See for example C. H. Meyer and S. M. Matyas, "Cryptography: A New Dimension in Computer Data Security," John Wiley & Sons, 1982.

1. Data Confidentiality. Data confidentiality protects the contents of a message or file from unauthorized disclosure.

Applications of data confidentiality include the following:

a. Session Protection. Data encryption is used to protect the confidentiality or session level data transmission between two communicating devices. Each end user (device or application) shares a common data encrypting/decrypting key, thus permitting each end user to both send and receive encrypted data.

Figure 25:
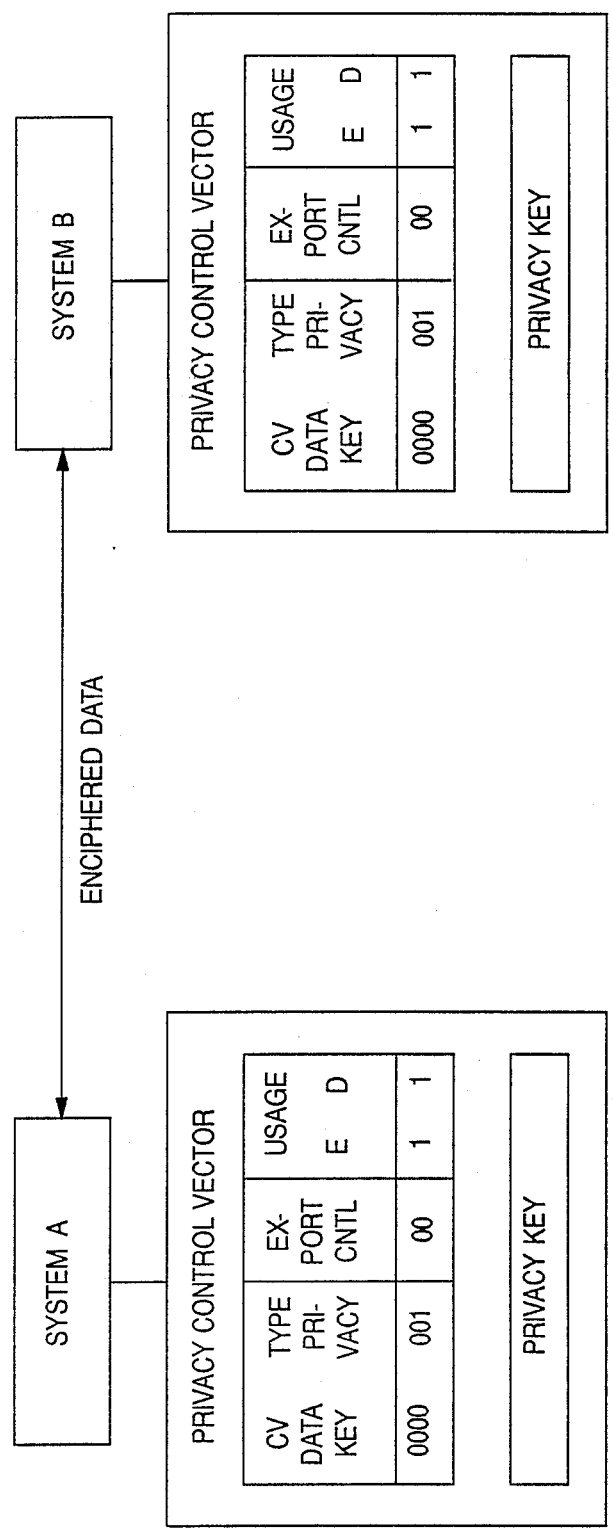
FIG. 25 shows the operation of session protection.

In accordance with the invention, as shown in FIG. 25, session protection is provided by a data/privacy key shared between two end users. Each key is stored in operational form, i.e., encrypted under the master key of each respective device. The control vector usage attributes of each key are encipher (E) and decipher (D), respectively, which enables each key to be used to both encipher with an encipher instruction and decipher data with a decipher instruction.

b. File Protection. Data encryption to protect the confidentiality of data files. A single end user (device or application) possesses a data encrypting/decrypting key KD permitting data to be encrypted for storage and to be decrypted, at a later time, for purposes of recovery or access to the file.

Figure 26:
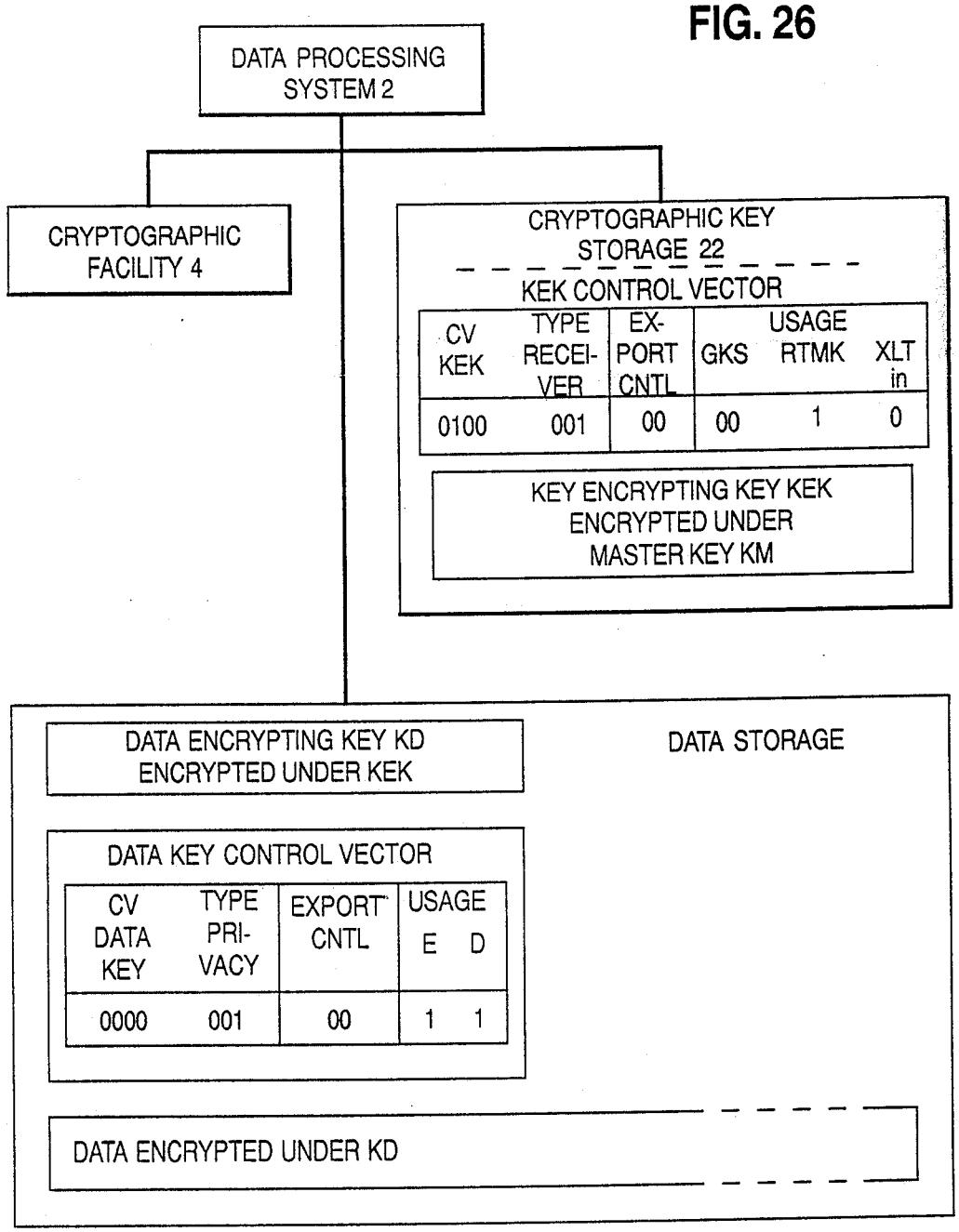
FIG. 26 shows the operation of file protection.

In accordance with the invention, as shown in FIG. 26, file protection is provided by a data/privacy key KD belonging to or possessed by a single end user. The key is stored in import form, i.e., encrypted under a key encrypting key with KEK/receiver attribute. The encrypted data/privacy key is stored in a data storage with the encrypted data, e.g., in a file header record. Because the key KD is encrypted under KEK in the import form, a re-encipher to master key (RTMK) instruction is authorized by the control vector for KEK to enable it to re-encipher the data/privacy key KD under the master key KM. Once in the operational form, the key KD can be used to encipher and decipher data. Storing the key KD in data storage encrypted under KEK in the import form means that the master key KM can be changed without causing the data/privacy key KD to be invalid or unusable for file recovery. The control vector usage attributes of the data/privacy key KD are encipher (E) and decipher (D). This permits a data file to be both encrypted using an encipher instruction and decrypted using a decipher instruction with the same key.

c. Encrypted Mail Box. The encrypted mail box describes a multi-user environment in which each user has a data/privacy key in two encrypted forms, encrypted under a storage key formed as the exclusive-OR of the master key KM and the control vector of the associated data/privacy key. The first form permits data encryption; the second form permits data decryption. The first form of the key is placed in a central directory or central registry accessible to all users of the system. Each so registered key is recorded under a user identifier belonging to the user who registers the key. Each sending user i can obtain a copy from the central directory. He then stores the encryption key under his master key KMi. The second form of the key is kept private by the receiving user j to which it belongs, under j's master key KMj. Thus, a user i who wishes to send encrypted messages to user j, first requests user j's encryption key from the public directory. Data encrypted by user i using an encipher instruction with this key is then sent to user j and placed in user j's mail box. User j can read received mail by decrypting first with his/her private decryption key using a decipher instruction. But since no other user has access to user j's decryption key, the environment is such that users can encrypt mail going to each other user but only the authorized designated receiving user can decrypt and read his/her mail.

Figure 27:
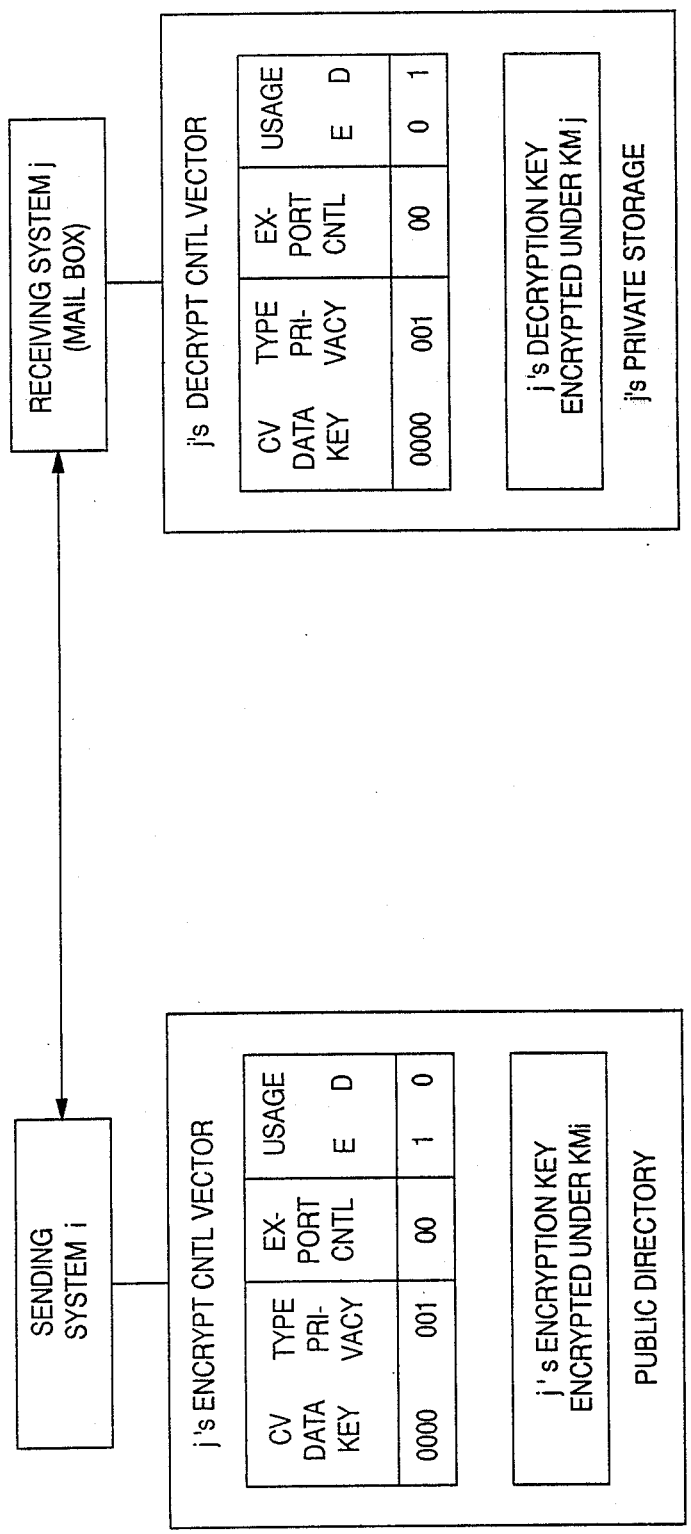
FIG. 27 shows the operation of encrypted mail box.

In accordance with the invention, as shown in FIG. 27, an encrypted mail box environment is provided via a data/privacy key which has been generated in two forms. The first form permits encipher (E) only and the second form permits decipher (D) (not necessarily decipher only, since possession of both encipher and decipher attributes by the recipient would suffice). The control vector usage attributes for the first form of the data/privacy key are encipher (E) only and for the second form of the key are decipher (D) only (or both E and D).

d. Ciphertext Translation Center (CTC). The ciphertext translation center is a network node or device capable of securely translating encrypted data from encryption under a first data key to encryption under a second data key with a translate ciphertext instruction. In effect, the CTC possesses one or more data keys under which encrypted data may be received and one or more data keys under which received encrypted data may be re-encrypted. These data keys thus establish a secure channel permitting the CTC to translate ciphertext from one key to another but not to decrypt ciphertext. The CTC may be further restricted from encrypting data with one or more of these data/privacy keys for the purpose of introducing data into the secure channel.

Figure 28:
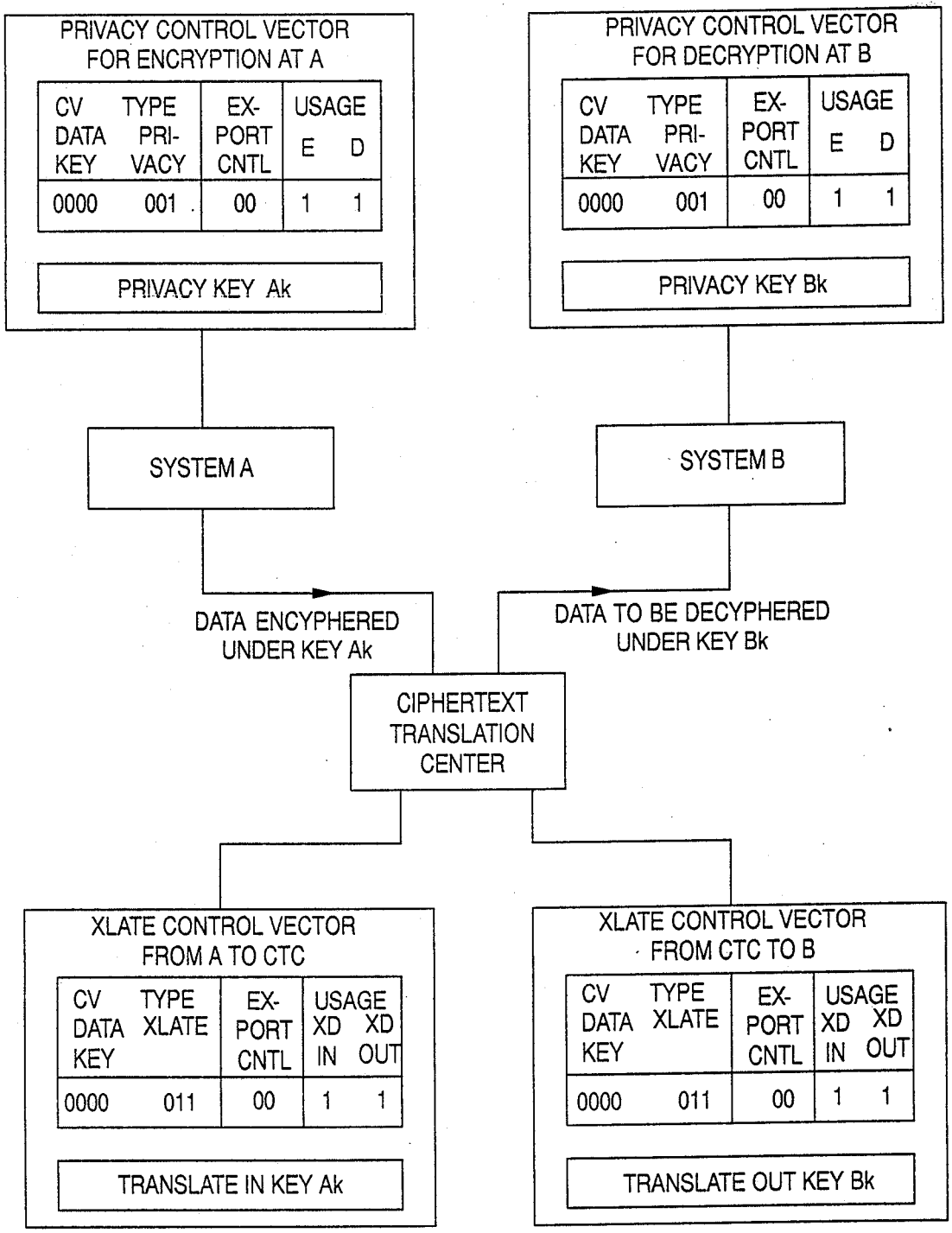
FIG. 28 shows the operation of ciphertext translation center.

In accordance with the invention, as shown in FIG. 28, a ciphertext translation center is provided via a data/xlate key used in combination with a data/privacy key. Consider a network of n devices connected to a single ciphertext translation center (CTC). Each device generates a data key in two encrypted forms. The first form is a data/privacy key stored in operational form, where the storage key is the master key KM exclusive-ORed with the control vector of the data/privacy key. The control vector for this key has encipher (E) and decipher (D) attributes for bidirectional communication. The second form is a data/xlate key in export form, suitable for export to the CTC where the storage key is a key encrypting key KEK which is exclusive-ORed with the control vector of the data/xlate key. At the CTC, the received data/xlate key is imported using the RTMK instruction, which converts the received data/xlate key to an operational form. The control vector for this key has Xlate-in and Xlate-out attributes for bidirectional communication. Thus, data enciphered at device "i" can be translated with a translate ciphertext instruction at the CTC to encipherment under a key known to any one of the other devices. But the CTC cannot decrypt received inbound encrypted data nor encrypt data in a form comparable to the outbound encrypted data, since the control vector associated with the data/xlate key has no usage attributes permitting the encipher or decipher instructions to be executed.

Figure 29:
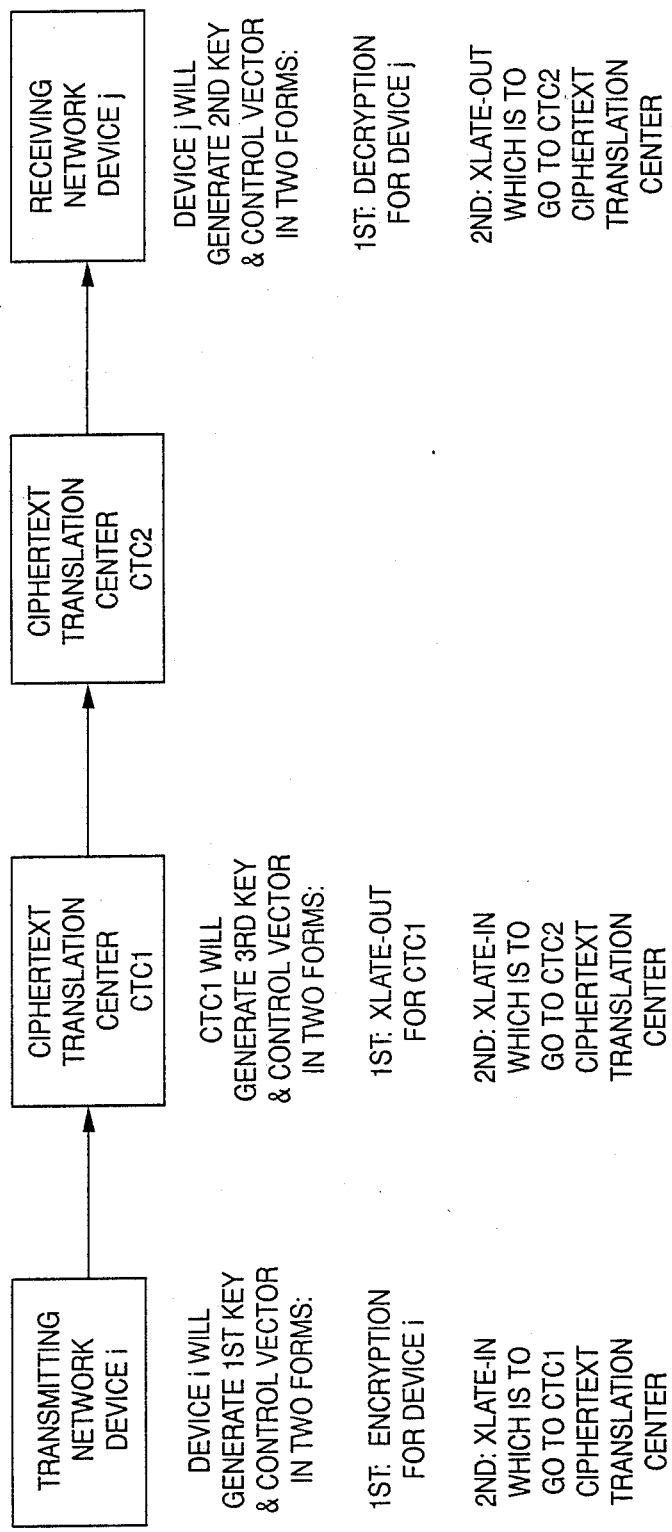
FIG. 29 shows the operation of peer-to-peer ciphertext translation.

In order to provide only unidirectional ciphertext translation from system A to system B, the respective control vectors establish that the first form of the first data key is a data/privacy key with an encipher only usage attribute; the second form of the first data key is a data/xlate key with an xlate-in usage attribute; the first form of the second data key is a data/privacy key with a decipher only (or encipher and decipher) usage attribute; and the second form of the second data key is a data/xlate key with an xlate-out usage attribute.

e. Peer-to-Peer Ciphertext Translation. As is shown in FIG. 29, this environment consists of a chain of two or more CTCs which establish a secure channel from one set of network devices to another set of network devices. FIG. 29 is a example of unidirectional peer-to-peer ciphertext translation. The first CTC in the chain possesses one or more data keys under which encrypted data may be received from the first set of network devices. Each CTC in the chain possesses one or more data keys under which encrypted data may be re-encrypted, but not decrypted. The CTCs may be further restricted from encrypting data with one or more of these keys for the purpose of introducing data into the secure channel. The last CTC in the chain re-encrypts the encrypted data under one or more data keys shared with members of the second set of network devices.

In accordance with the invention, a ciphertext translation center is provided via a data/xlate key used in combination with either a data/privacy key or another data/xlate key. Consider a node i of a network A of devices connected to a node j of a network B of devices via a chain of k CTCs, labeled in order CTC1, CTC2, ..., CTCk. Node i generates a data key in two forms. The first form is a data/privacy key in operational form. The control vector for this key has an E attribute. The second form is a data/xlate key in export form, suitable for export to CTC1, the first CTC in the chain. At CTC1, the received data/xlate key is imported using the RTMK instruction, which converts the received data/xlate key to an operational form. The control vector for this key has an xlate-in attribute.

Node j generates a key in the same two forms: an operational data/privacy key and exportable data/xlate key. The control vector of j's data/privacy key has a decipher attribute. The data/xlate key is shipped to CTCk, the last CTC in the chain. At CTCk, the received data/xlate key is imported to operational form via a RTMK. The control vector for this key has an xlate-out attribute.

Each CTC in the chain (except CTCk) generates a data/xlate key in two forms: operational and exportable. The operational data/xlate key has a control vector with an xlate-out attribute. The exportable form is shipped to the next CTC in the chain, i.e. CTCx ships to CTC(x+1) for x equals 1 to (k−1). The receiving CTC imports the received data/xlate key and converts it to operational form via the RTMK instruction. The control vector for the data/xlate key has an xlate-in attribute.

Alternately, a third party node can generate and ship a data/xlate key and its associated control vector in two forms for nodes x and x+1, an xlate-out for node x and an xlate-in for node x+1.

Thus, data enciphered at node i of network A with the encipher instruction, can be translated and re-translated along the chain of CTCs from CTC1 to CTCk with a translate ciphertext instruction and finally to node j of network B. But none of the CTCs in the chain can decrypt received inbound data nor encrypt arbitrary data in a form comparable to the outbound encrypted data. Thus, the chain of CTCs and the above-defined keys form a secure channel permitting the CTCs, as a group to translate data enciphered under one key held by node i to encipherment under another key held by node j. Although FIG. 29 shows a unidirectional peer-to-peer communication, the control vectors can be modified to allow bidirectional communication.

f. Translate Part of an Encrypted File. This is an application wherein part of an encrypted file can be translated to a key which can be conveniently shared with an intended receiver. The method avoids sharing the original data/privacy key used to encrypt the file, since doing so may jeopardize the confidentiality of data not intended to be shared.

In order for a user or application program to beneficially use this feature, it is necessary for the user to generate a data key in two encrypted forms. The first form of the data key is a data privacy key stored in operational form, i.e., encrypted under a storage key formed as the exclusive-OR operation of the master key and a first control vector associated with the first form of the data key. The second form of the data key is a data xlate key stored in import form., i.e., encrypted under a storage key formed as the exclusive-OR operation of a key encrypting key KEK1 and a second control vector associated with the second form of the data key, where the control vector of KEK1 defines KEK1 as an emport key encrypting key. (Note: defining KEK1 as an import key encrypting key permits the so encrypted data xlate key encrypted under KEK1 to be re-enciphered, at any later time, from encipherment under KEK1 to encipherment under the master key via a re-encipher to master key (RTMK) instruction.) The control vector for the first form of the data key is a data/privacy control vector with usage attribute encipher (E), thus allowing data to be enciphered under the data key via an encipher instruction. The control vector for the second form of the data key is a data/xlate control vector with usage attribute xlate in (Xin), thus allowing data enciphered under the data key to be translated from encipherment under the data key to encipherment under some other data key via a translate ciphertext instruction.

Figure 30:
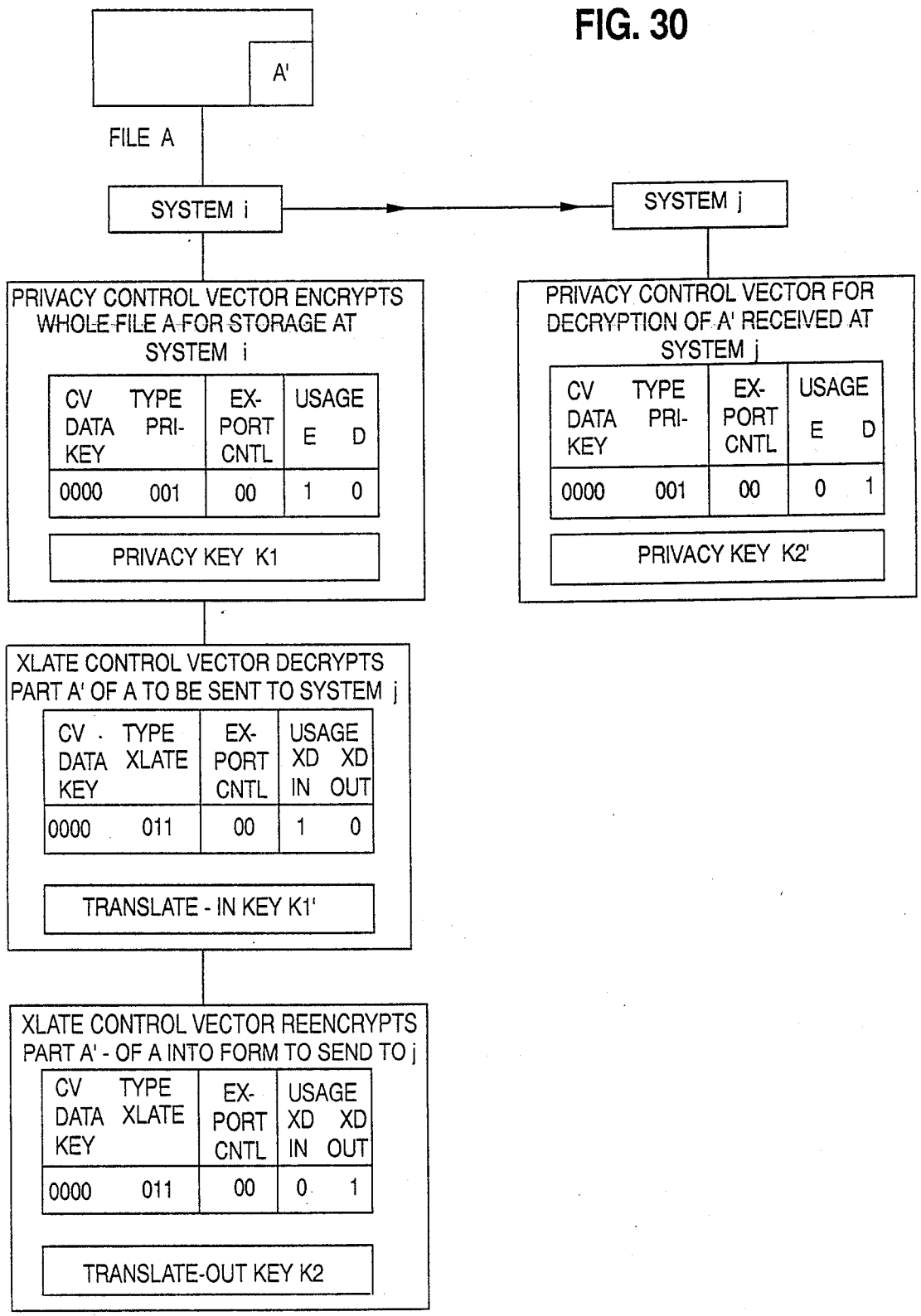
FIG. 30 shows translating part of an encrypted file.

In practice, as shown in FIG. 30 the data file is first encrypted with the data key K1 via an encipher instruction using the first form of the data key, i.e., the operational form of the key whose control vector is a data/privacy control vector with usage attribute encipher (E). The second form of the data key stored in import form is written in a header record of the encrypted data file. Thus, at any later time when it is desired to translate part of the encrypted data file from encryption under the present data key (called the first data key) to encryption under a second data key, the following procedure is followed. The second form of the first data key stored in import form and written in the header record of the encrypted data file is accessed and is re-enciphered from encryption under KEK1 to encryption under the master key by using an RTMK instruction. This converts the second form of the data key (i.e., the data/xlate with xin usage attribute) to an operational key which is now suitable for use in translate ciphertext instruction.

A second data key K2 is now generated in two encrypted forms. The first encrypted form of the key is a data/xlate key stored in operational form, i.e., encrypted under a storage key formed as the exclusive-OR operation of the master key and the control vector associated with the data/xlate key. The second encrypted form of the key is a data/privacy key stored in export form, i.e., encrypted under a key encrypting key KEK2 shared with the intended receiver. (It is assumed that the intended receiver can import the so-generated data/privacy key via a re-encipher to master key (RTMK) instruction, thus causing the data/privacy key to be stored encrypted under a storage key formed as the exclusive-OR operation of the master key of the supporting device and the control vector associated with the data/privacy key.) The control vector usage attributes for the first form of the second data key (i.e., for the data/xlate key) are xlate out (Xout) and for the second form of the second data key (i.e., for the data/privacy key) are decipher (D) only (or decipher and encipher). Now a portion of the encrypted data file is re-enciphered from encryption under the first data key to encryption under the second data key via a translate ciphertext instruction, using second encrypted form of the first data key which has been re-enciphered from import form to operational form (whose control vector designates the key as a data/xlate key with Xin usage attribute) and the first encrypted form of the second data key already in operational form (whose control vector designates the key as a data/xlate key with Xout usage attribute). The so-translated ciphertext is then sent from system i to the intended receiver system j, whereupon the encrypted data is decrypted via a decipher instruction, using the second form of the second data key (whose control vector designates the key as a data/privacy key with a D usage attribute).

As is seen by the example part A' of the encrypted file A can be given to another user j without requiring the data to be decrypted in clear form at the device of the first user i and without requiring the first user i to share the data key K1 under which the entire file A is encrypted.

2. Data Integrity. Data integrity protects the contents of a message or file from unauthorized modification. This includes changes, additions, and deletions to the data. Cryptography provides only methods for detecting unauthorized changes to data. It cannot prevent unauthorized changes to data.

a. Message Integrity. Each end user (device or application program) in a multi-user environment shares a common data MAC generation/verification key, thus permitting each end user to generate MACs (message authentication codes) on messages transmitted to any other end user and permitting each end user to verify MACs on messages received from other end users.

Figure 31:
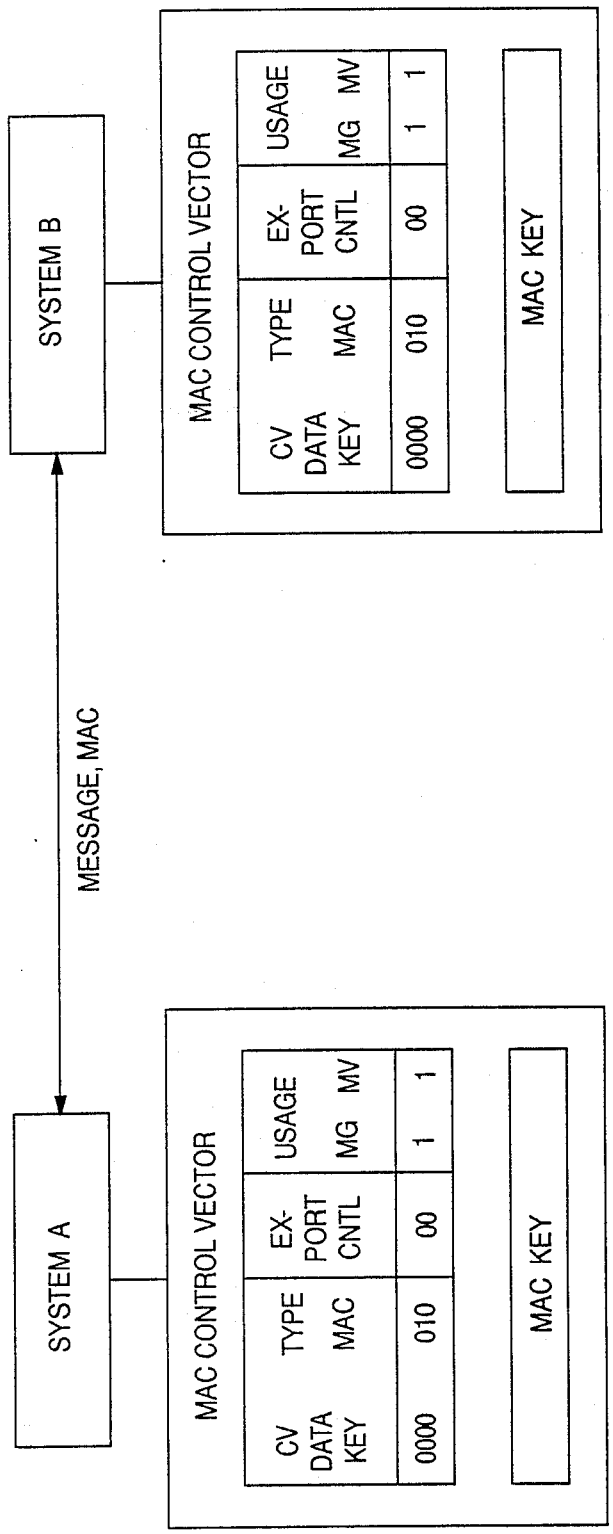
FIG. 31 shows message integrity using control vectors.

In accordance with the invention, as shown in FIG. 31, message integrity is provided by a data/MAC key shared between two end users. Each key is stored in operational form, i.e., encrypted under a storage key formed as the exclusive-OR operation of the master key of the device serving each respective end user and the control vector associated with the data/MAC key. The control vector usage attributes of each key are MAC generation (MG) and MAC verification (MV), respectively, which permits each user's key to be used for both MAC generation and MAC verification. Thus, the integrity of messages communicated between the respective end users can be assured. Thus, for example, the first end user generates a MAC on a message to be sent to the second end user via a generate MAC instruction, using his copy of the data/MAC key. The message and MAC are then communicated to the second end user. The second end user verifies the MAC via a verify MAC instruction, using his copy of the data/MAC key. Since the control vectors for each copy of the key have usage attributes MG and MV, each user can generate and verify MACs with the key, and messages and MACs can be communicated from the first user to the second user or the second user to the first user.

b. Message Integrity with Non-Repudiation. Each end user (device or application program) in a multi-user environment has a data/MAC key in two encrypted forms, i.e., encrypted under a storage key formed as the exclusive-OR operation of the respective device master key and the respective control vector associated with the data/MAC key. The first form permits MAC verification; the second form permits MAC generation. The first form of the key is placed in a public directory or central registry accessible to all users of the system. Each so registered key is recorded under a user identifier belonging to the user who registers the key. The second form of the key is kept private by the user to which it belongs. Thus, a user j who wishes to send a message and MAC to user i, generates a MAC on the desired message via a GENMAC instruction using the private MAC generation key belonging to user j. The message and MAC are then communicated to user i. To verify the received message and MAC, user i first requests user j's MAC verification key from the public directory. (Note: if the public directory is located at a device different from the device supporting user i, then it is necessary to export and import the desired key using an RFMK and an RTMK instruction. This causes the MAC verification key to be re-enciphered under a key encrypting key shared between the two devices, via an RFMK instruction, for purposes of exporting the key and then to be re-enciphered under the master key at the device supporting user i via an RTMK instruction.) User i then verifies the received message and MAC via a verify MAC instruction using j's MAC verification key. But since no other user has access to user j's MAC generation key, the environment is such that users can verify MACs and messages received from any other user (say user v) but cannot generate MACs on messages using any other user's MAC generation key. Thus one user cannot pose as another user and generate MACs with another user's MAC generation key. Conversely, a user (say user j) cannot deny or repudiate a valid message and MAC as having originated with that user if the message and MAC is successfully verified with that user's MAC verification key via the verify MAC instruction. This is called non-repudiation.

Figure 32:
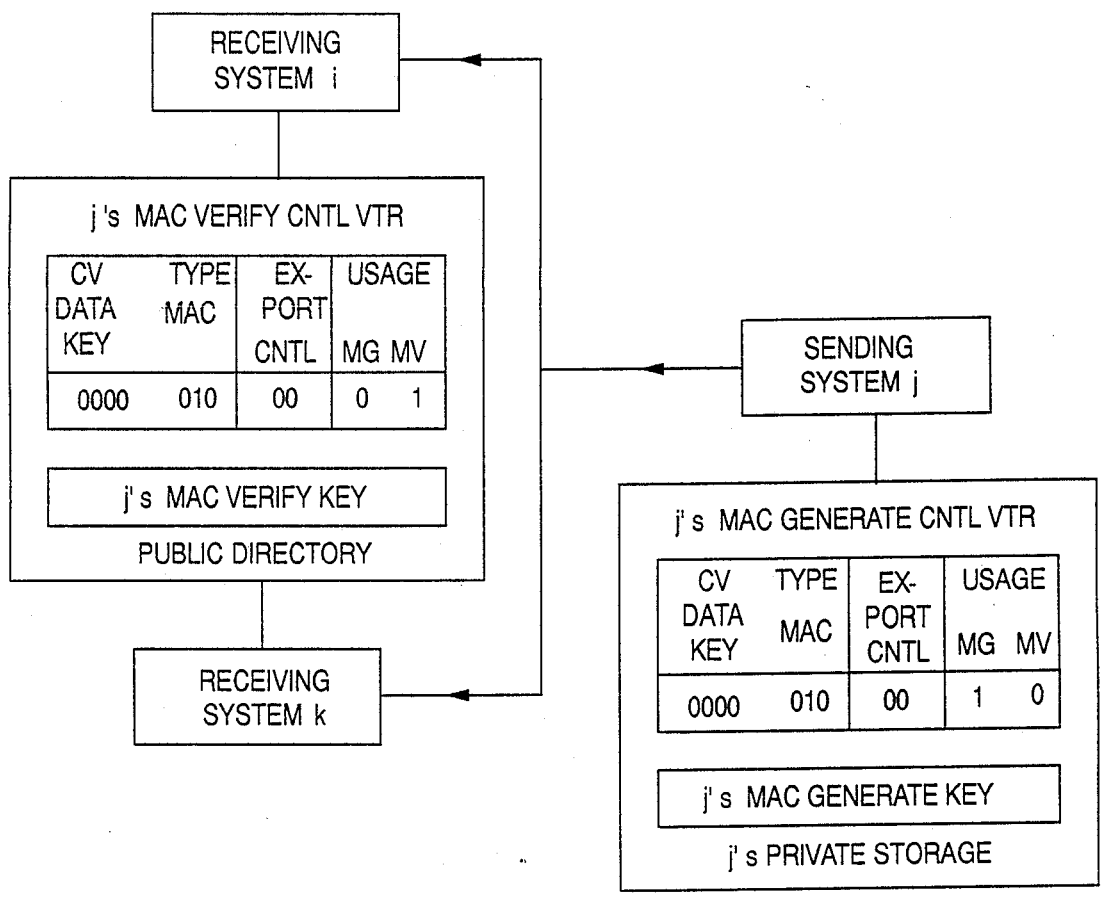
FIG. 32 shows message integrity with non-repudiation using control vectors.

In accordance with the invention, as shown in FIG. 32, message integrity with non-repudiation is provided via a data/MAC key which has been generated in two encrypted forms. The first form permits MAC verification only and the second form permits MAC generation (not necessarily MAC generation only, since possession of both MAC generation and MAC verification would suffice). The control vector usage attributes for the first form of the data/MAC key are MAC verification (MV)

only and for the second form of the key are MAC generation (MG) only (or both MG and MV).

3. Message Authentication. Message authentication is a procedure established between two communicants which allows each communicant to verify that received messages are genuine. Communicants can be people, devices, or processing functions. Message authentication allows the receiver of a message to determine that:
   a. The message originated with the alleged sender.
   b. The contents of the message have not been accidentally or intentionally changed.
   c. The message has been received in the same sequence that it was transmitted.
   d. The message was delivered to the intended receiver.

Figure 33:
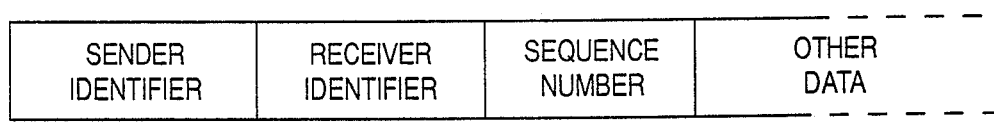
FIG. 33 shows a message format.

As can be seen, message authentication encompasses a requirement for message integrity, but is a broader concept. Message authentication, as defined here, permits the receiver to additionally validate a message's origin, timeliness or sequence, and intended destination. To accomplish these additional features, a sender identifier field, a receiver identifier field, and a sequence number field are included in each message, as shown in FIG. 33. Thus, upon receipt of a message and MAC, the contents of the message are first authenticated via the MAC using a verify MAC instruction and a MAC verification key shared between the two users (i.e., which has been previously established via the key management processes). Once the contents of the message have been authenticated, a simple check is performed to verify that the sender identifier is equal to the identifier of the MAC verification key belonging to the anticipated or intended sender of the message, that the value in the sequence number field is one greater than the sequence number in the previously received message from that same sender, and that the receiver identifier is equal to the identifier of the actual receiver. If all checking is passed successfully, the received message is accepted as valid; otherwise the message is rejected. Message authentication and message authentication with non-repudiation are achieved in the same way the data integrity and data integrity with non-repudiation are achieved (see the applications described under items 2a and 2b, respectively), except that additional fields are defined and checked in the message as just outlined.

In an alternate embodiment of the invention, clear keys can be stored in the crypto facility for immediate availability in cryptographic operations. Those clear keys can be stored for example in the working storage 24 in FIG. 1 of the crypto facility 4 or alternately they can be stored in the working key registers of the crypto facility as in shown in FIG. 2.

In a first method, each key and its associated control vector are stored as a paired expression in the RAM within the crypto facility. Each such key and control vector are initialized within the crypto facility, in advance of their intended use, via a special authorized procedure available only to authorized system personnel (e.g., a security officer). A procedure similar to initializing a master key (e.g., via a hand-held key entry device attached to a front panel interface, which is enabled via a physical key-activated key switch) could easily be adapted for initializing keys and control vectors within the crypto facility. Methods for initializing parameters within the crypto facility are well-known in the art. During routine operations, in order to access a particular key, the associated control vector is first accessed and the control vector checking operation is carried out as has been previously described, in order to ensure that the proposed key usage is authorized. If the authorization is affirmative, then the corresponding key is accessed from the RAM and is used for the intended operations within the crypto facility.

In a second method, the exclusive-OR product of the key and its associated control vector are stored in the RAM inside the crypto facility, i.e., instead of store the key and control vector paired expression (as with the first method) the key and control vector are exclusive-ORed and the product of the exclusive-OR operation is stored in the RAM inside the crypto facility. A procedure for initializing the crypto facility could be based on performing the exclusive-OR operation of the key and control vector outside the crypto facility and then entering their product as a parameter using a procedure similar to that for entering the key and control vector, as described for the first method. Alternatively, the key and control vector could be exclusive-ORed within the crypto facility and the product then stored as before. Later on, the steps to access a key can be traced as follows. An instruction which designates the use of a particular key must also provide the control vector associated with that key as a parameter of the instruction. The control vector is first checked, as before, using the control vector checking operation, in order to ensure that the proposed key usage is authorized. If the authorization is affirmative, the exclusive-OR product of the key and control vector stored in the crypto facility is accessed and exclusive-ORed with the control vector supplied as a parameter to the instruction to recover the clear key which is then used in the intended cryptographic operations. It can be seen that if cheating is attempted, i.e., a false control vector is specified in an instruction, then the clear value of the recovered key is not correct (i.e., is not the correct key value). The crypto instructions are designed such that no useful outputs are obtained when an incorrect key value is produced as a result of such control vector cheating.

Although specific embodiments of the invention have been disclosed, it will be understood by those having skill in the art that changes can be made to these specific embodiments without departing from the spirit and scope of the invention.

What is claimed is:

1. In a data processing system which processes cryptographic service requests for performing data cryptography functions on data using cryptographic keys which are associated with control vectors defining the functions which each key is allowed by its originator to perform, an apparatus for validating that the data cryptography functions requested for a cryptographic key have been authorized by the originator of the key, comprising:

a cryptographic facility characterized by a secure boundary through which passes an input path for receiving said cryptographic service requests, data, cryptographic keys and their associated control vectors, and an output path for providing responses thereto, there being included within said boundary a cryptographic control means coupled to said input path, a control vector checking means and a cryptographic processing means coupled to said control means, and a master key storage coupled to said processing means, for providing a secure location for executing data cryptography functions in response to said received service requests;

said cryptographic control means receiving over said input path a cryptographic service request for performing a data cryptography function with a cryptographic key;

said control vector checking means having an input coupled to said input path for receiving a control vector associated with said cryptographic key and an input coupled to said cryptographic control means, for receiving control signals to initiate checking that said control vector authorizes the data cryptographic function which is requested by said cryptographic service request;

said control vector checking means having an authorization output coupled to an input of said cryptographic processing means, for signalling that said data cryptography function is authorized, the receipt of which by said cryptographic processing means initiates the performance of the requested data cryptography function with said cryptographic key.

2. The apparatus of claim 1, which further comprises:
a cryptographic key storage means coupled to said cryptographic facility over said input and output paths, for storing said cryptographic key in an encrypted form in which said cryptographic key is encrypted under a storage key which is a logical product of said associated control vector and a master key stored in said master key storage;

said cryptographic control means receiving over said input path a cryptographic service request for performing a data cryptographic function which includes recovering said cryptographic key from said cryptographic key storage means and said control vector checking means outputting in response thereto, an authorization signal to said cryptographic processing means that the requested data cryptographic function is authorized;

said cryptographic processing means operating in response to said authorization signal, to receive said encrypted form of said cryptographic key from said cryptographic key storage means and to decrypt said encrypted form under said storage key whichis a logical product of said associated control vector and said master key stored in said master key storage;

said cryptographic processing means further operating in response to said authorization signal, to receive said data from said input path and to complete performing the requested data cryptography function on said data with said cryptographic key.

3. The apparatus of claim 2, wherein said storage key is the exclusive-OR product of said associated control vector and said master key stored in said master key storage.

4. The apparatus of claim 2, wherein said associated control vector is stored with said encrypted form of said cryptographic key in said cryptographic key storage means.

5. The apparatus of claim 1, wherein said associated control vector includes fields defining authorized types of cryptographic functions including key management functions, data cryptography functions and PIN processing functions, and the data cryptography functions type is designated.

6. The apparatus of claim 5, wherein said associated control vector includes fields defining export control and usage.

7. The apparatus of claim 2, wherein said associated control vector includes a type field designating that said cryptographic key can perform data cryptography functions and further includes an export control field which designates whether said local data processing system is allowed to export said cryptographic key and further designates whether a remote data processing system to which said local data processing system is connected, is allowed to reexport said cryptographic key.

8. The apparatus of claim 1, wherein said associated control vector includes a type field designating that said cryptographic key can perform data cryptography functions and further includes a subtype field designating that said cryptographic key can perform data privacy functions.

9. The apparatus of claim 8, wherein said associated control vector further includes a usage field designating that said cryptographic key can perform encryption of said data.

10. The apparatus of claim 8, wherein said associated control vector further includes a usage field designating that said cryptographic key cannot perform encryption of said data.

11. The apparatus of claim 8, wherein said associated control vector further includes a usage field designating that said cryptographic key can perform decryption of said data.

12. The apparatus of claim 8, wherein said associated control vector further includes a usage field designating that said cryptographic key cannot perform decryption of said data.

13. The apparatus of claim 1, wherein said associated control vector includes a type field designating that said cryptographic key can perform data cryptography functions and further includes a subtype field designating that said cryptographic key can perform message authentication functions.

14. The apparatus of claim 13, wherein said associated control vector further includes a usage field designating that said cryptographic key can be used to generate a message authentication code on said data.

15. The apparatus of claim 13, wherein said associated control vector further includes a usage field designating that said cryptographic key cannot be used to generate a message authentication code on said data.

16. The apparatus of claim 13, wherein said associated control vector further includes a usage field designating that said cryptographic key can be used to verify a message authentication code on said data.

17. The apparatus of claim 13, wherein said associated control vector further includes a usage field designating that said cryptographic key cannot be used to verify a message authentication code on said data.

18. The apparatus of claim 1, wherein said associated control vector includes a type field designating that said cryptographic key can perform data cryptography functions and further includes a subtype field designating that a translate ciphertext function can be performed by said cryptographic key.

19. The apparatus of claim 18, wherein said associated control vector further includes a usage field designating that said cryptographic key can be used as the output data key in a translate ciphertext function.

20. The apparatus of claim 18, wherein said associated control vector further includes a usage field designating that said cryptographic key cannot be used as the output data key in a translate ciphertext function.

21. The apparatus of claim 18, wherein said associated control vector further includes a usage field designating that said cryptographic key can be used as the input data key in a translate ciphertext function.

22. The apparatus of claim 18, wherein said associated control vector further includes a usage field designating that said cryptographic key cannot be used as the input data key in a translate ciphertext function.

23. The apparatus of claim 1, wherein said associated control vector includes a type field designating that said cryptographic key can perform data cryptography functions and further includes a subtype field designating that said cryptographic key is an ANSI data key.

24. In a data processing system which processes cryptographic service requests for the performance of data cryptography functions on data using cryptographic keys which are associated with control vectors defining the functions which each key is allowed by its originator to perform, a method for validating that data cryptography functions requested for a cryptographic key have been authorized by the originator of the key, comprising the steps of:
   receiving a cryptographic service request for performing a data cryptography function on data using a cryptographic key in a cryptographic facility characterized by a source boundary through which passes an input path and an output path;
   receiving a control vector associated with said cryptographic key and checking that said control vector authorizes the data cryptography function which is requested by said cryptographic service request;
   signalling that said data cryptography function is authorized and initiating the performance of the requested data cryptography function with said cryptographic key.

25. The method of claim 24, which further comprises the steps of:
   storing in a storage means said cryptographic key in an encrypted form in which said cryptographic key is encrypted under a storage key which is a logical product of said associated control vector and a master key.

26. The method of claim 24, wherein said associated control vector includes fields defining authorized types of cryptographic functions including key management functions, data cryptography functions and PIN processing functions, and the data cryptography functions type is designated.

27. The method of claim 24, wherein said data cryptography function is session protection to protect the confidentiality of data transmissions between two communicating devices in said system which share a common data encrypting/decrypting key, permitting each said device to both send and receive encrypted data, further comprising the steps of:
   sharing a data privacy key between said devices;
   storing said data privacy key in operational form encrypted under a master key at each respective device;
   providing usage attributes for the control vector of each data privacy key for enciphering and deciphering, respectively, which enables each key to be used to both encipher and decipher data.

28. The method of claim 24, wherein said data cryptography function is file protection to protect the confidentiality of data files, wherein a single end user of said system possesses a data encrypting/decrypting key permitting data to be encrypted for storage and to be decrypted for purposes of recovery of the file, further comprising the steps of:
   providing a data privacy key to said single end user;
   storing an encrypted form of said data privacy key with data which has been encrypted thereby;
   said data privacy key being stored in import form encrypted under a key encrypting key, with its associated control vector;
   providing usage attributes for the control vector of said data privacy key for enciphering and deciphering, thereby permitting the data file to be both encrypted and decrypted with the same key.

29. The method of claim 24, wherein said data cryptography function is an encrypted mail box in which each of a plurality of users of said system has a data privacy key in two forms, a first form permitting data encryption and a second form permitting data decryption, the first form of the key being placed in the public directory accessible to all said users of the mail box so that each registered key is recorded under a user identifier belonging to one of said users who registers the key, the second form of the key being private to said one of said users to which it belongs, so that mail deposited in the mail box directed to said one of said users in its encrypted form, can be decrypted only by said one of said users who is the intended recipient, further comprising the steps of:
   providing a data privacy key which has been generated in two forms, a first form permitting enciphering only and a second form permitting deciphering;
   providing control vector usage attributes for the control vector associated with said data privacy key, which has for the first form of the data privacy key encipher only features and which has for the second form of the data privacy key decipher features.

30. The method of claim 24, wherein said data cryptography function is a ciphertext translation function to be performed at a ciphertext translation center in a network in said system capable of securely translating encrypted data from encryption under a first data key to encryption under a second data key, further comprising the steps of:
   generating a data key in two forms at a plurality of devices in a communications network in said system, a first form being a data privacy key in operational form having an associated control vector which has encipher and decipher attributes, and a second form of the data key being a data translate key in the export form, suitable for export to a ciphertext translation center in the network;
   receiving the data translate key at the ciphertext translation center and converting the received data translation key to an operational form, the control vector associated with said data translation key having both translate-in and translate-out attributes;
   enciphering data at a first device in said network which is transmitted to said ciphertext translation center where it is translated to encipherment under said second data key known to a second device in the network connected to said ciphertext translation center;

transmitting said translated data from said center to said second device where it is deciphered under said second data key.

31. The method of claim 30, wherein said ciphertext translation center cannot decrypt received inbound encrypted data nor can it encrypt data in a form comparable to outbound encrypted data.

32. The method of claim 24, wherein said data cryptography function is a peer-to-peer ciphertext translation for a communications network chain in said system which includes a first device which originates a communication, connected to a first ciphertext translation center which in turn is connected to a second ciphertext translation center which in turn is connected to a second network device, for a transmission of encrypted data from said first device through said first and second ciphertext translation centers to said second device, further comprising the steps of:

generating a first data key in said first network device in two forms, a first form being a data privacy key in operational form having an associated control vector which has encipher attributes, and a second form of said first data key being a data translate-in key in the export form, suitable for export to said first ciphertext translation center;

generating a second data key in said second network device in two forms, a first form being a data privacy key in operational form having an associated control vector which has decipher attributes, and a second form of said second data key being a data translate-out key in export form, suitable for export to said second ciphertext translation center;

generating a third data key in said first ciphertext translation center in two forms, a first form being a data translate-out key and a second form being a data translate-in key, suitable for export to said second ciphertext translation center;

said first network device transmitting said first data key in its second form as a translate-in key to said first ciphertext translation center;

said second network device transmitting said second data key in its second form as a translate-out key to said second ciphertext translation center;

said first ciphertext translation center transmitting said third data key in its second form as a translate-in key to said second ciphertext translation center;

said first network device encrypting data under said first data key in said first form and transmitting the encrypted data to said first ciphertext translation center where the data is translated under said first data key in said second form to be encrypted under said third data key in said first form to be translated out and transmitted to said second ciphertext translation center where the data is translated under said third data key in its second form into a form encrypted under said second data key in its second form where it is translated out and transmitted to said second network device where the data is then decrypted under said second data key in its first form.

33. The method of claim 24, wherein said data cryptography function is applied to an encrypted file under a first key so that a portion of the file can be re-encrypted under a second key for transmission to an intended receiver, without revealing the entire encrypted file, further comprising the steps of:

generating a first data key in two forms at a first device in said system, a first form being a data privacy key stored in operational form and a second form being a data translate-in key;

encrypting a data file using said data privacy key and storing said file in its encrypted form in a data storage device;

said first device generating a second data key in two forms, a translate-out key and a data decryption key;

transmitting said data decryption key to a second device in said system connected to said first device;

accessing said data file from said data storage device and re-enciphering a portion of said file from encipherment under said first data key to encipherment under said second data key via a translate ciphertext instruction using said first data key in said translate-in form and said second data key in said translate-out form, and transmitting said re-enciphered portion of said data file from said first device to said second device;

decrypting said transmitted portion of said data file by means of said decryption key form of said second key for use at said second device.

34. The method of claim 24, wherein said data cryptography function is message integrity, wherein the contents of a message is protected from unauthorized modification, further comprising the steps of:

providing a data/MAC key and an associated control vector having MAC generation and MAC verification attributes at both a sending station and a receiving station in a communications network in said system;

computing an MAC value for a message to be sent from the sending station to the receiving station, employing said data/MAC key and said control vector at said sending station;

transmitting said message and said computed MAC value from said sending station to said receiving station;

computing a second MAC value on said received message at said receiving station, employing said data/MAC key and said control vector and comparing said second computed MAC value with said transmitted MAC value;

verifying the integrity of the message received at said receiving station when said two computed MAC values are equal.

35. The method of claim 24, wherein said data cryptography function is message authentication with non-repudiation, further comprising the steps of:

providing a data/MAC key with a first associated control vector having an MAC generation attribute at a sending station in a communications network in said system;

providing said data/MAC key with a second control vector having an MAC verification attribute but not having an MAC generation attribute, at a receiving station in said communications network in said system;

computing a first value for the MAC on a message to be sent by said sending station over said communications network to said receiving station, using the said data/MAC key and said first control vector at said sending station;

transmitting said message and said first MAC value from said sending station over said communications network to said receiving station;

computing a second value for said MAC on said message received at said receiving station, using said data/MAC key and said second control vector, at said receiving station;

verifying that said message has integrity and that it was sent by said sending station, when said first value for said MAC equals said second value for said MAC.

36. The apparatus of claim 1, which further comprises:

a working key storage within said cryptographic facility coupled to said cryptographic processing means, for providing a secure location for the storage of working keys.

37. The apparatus of claim 36, which further comprises:

said working key storage storing a plurality of working keys and their associated control vectors in clear text form.

38. The apparatus of claim 37, which further comprises:

said cryptographic facility receiving over said input path a cryptographic service request for performing a data cryptography function;

said control vector checking means checking the associated control vector accessed from said working key storage and outputting an authorization signal to said cryptographic processing means that said cryptographic service request is authorized using the respective key accessed from said working key storage.

39. The apparatus of claim 37, which further comprises:

said working keys being stored in said working key storage as the exclusive-OR product of each key with its respective control vector.

40. The apparatus of claim 39, which further comprises:

said cryptographic facility receiving over said input path a cryptographic service request for performing a data cryptography function and also receiving the corresponding associated control vector which undergoes control vector checking in said control vector checking means;

said control vector checking means outputting an authorization signal to said cryptographic processing means that said cryptographic service request is authorized, said corresponding exclusive-OR product of the control vector and its respective key then being exclusive-ORed with said control vector in order to recover the key for the requested cryptographic operation.

41. The apparatus of claim 1, which further comprises:

a working key storage within said cryptographic facility, for storing working keys in clear text form and for storing their respective associated control vectors;

said cryptographic control means receiving over said input path a cryptographic service request for performing a data cryptography function which includes accessing said cryptographic key and said associated control vector from said working key storage and said control vector checking means outputting in response thereto, an authorization signal to said cryptographic processing means that the requested data cryptography function is authorized;

said cryptographic processing means operating in response to said authorization signal, to complete performing the requested data cryptography function on said data with said cryptographic key.

42. The apparatus of claim 1, which further comprises:

a working key storage within said cryptographic facility coupled to said cryptographic processing means, for storing the exclusive-OR product of working keys and their associated control vectors;

said cryptographic control means receiving over said input path a cryptographic service request and the corresponding associated control vector, for performing a data cryptography function;

said control vector checking means checking said control vector and outputting in response thereto, an authorization signal to said cryptographic processing means that the requested data cryptography function is authorized;

said cryptographic processing means operating in response to said authorization signal, to perform an exclusive-OR operation between said control vector and said product which has been accessed from said working key storage, yielding said working key in clear text form;

said cryptographic processing means further operating in response to said authorization signal, to complete performing the requested data cryptography function with said cryptographic key.

43. The method of claim 24, wherein said data cryptography function is a peer-to-peer ciphertext translation for a communications network in said system chain which includes a key issuing device in the network, a first device which originates a communication, connected to a first ciphertext translation center which in turn is connected to a second ciphertext translation center which in turn is connected to a second network device, for a transmission of encrypted data from said first device through said first and second ciphertext translation centers to said second device, further comprising the steps of:

generating a first data key in said first network device in two forms, a first form being a data privacy key in operational form having an associated control vector which has encipher attributes, and a second form of said first data key being a data translate-in key in the export form, suitable for export to said first ciphertext translation center;

generating a second data key in said second network device in two forms, a first form being a data privacy key in operational form having an associated control vector which has decipher attributes, and a second form of said second data key being a data translate-out key in export form, suitable for export to said second ciphertext translation center;

generating a third data key in said key issuing device in two forms, a first form being a data translate-out key suitable for export to said first ciphertext translation center and the second form being a data translate-in key, suitable for export to said second ciphertext translation center;

said first network device transmitting said first data key in its second form as a translate-in key to said first ciphertext translation center;

said second network device transmitting said second data key in its second form as a translate-out key to said second ciphertext translation center;

said first key issuing device transmitting said third data key in its first form as a translate-out key to said first ciphertext translation center and transmitting said third data key in its second form as a translate-in key to said second ciphertext translation center;

said first network device encrypting data under said first data key in its first form and transmitting the encrypted data to said first ciphertext translation center where the data is translated under said first data key in its second form to be encrypted under said third data key in its first form to be translated out and transmitted to said second ciphertext translation center where the data is translated under said third data key in its second form into a form encrypted under said second data key in its second form where it is translated out and transmitted to said second network device where the data is then decrypted under said second data key in its first form.

* * * * *